United States Patent
Yoon

(10) Patent No.: US 9,171,495 B2
(45) Date of Patent: Oct. 27, 2015

(54) ELECTRONIC DEVICE AND METHOD OF CONTROLLING DISPLAY LIGHTING THEREOF

(71) Applicant: LG ELECTRONICS INC., Seoul (KR)

(72) Inventor: Ilsub Yoon, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 13/925,481

(22) Filed: Jun. 24, 2013

(65) Prior Publication Data

US 2014/0176456 A1    Jun. 26, 2014

(30) Foreign Application Priority Data

Dec. 20, 2012 (KR) .................. 10-2012-0149858

(51) Int. Cl.
| | |
|---|---|
| *G09G 3/36* | (2006.01) |
| *G09G 3/32* | (2006.01) |
| *G09G 3/20* | (2006.01) |

(52) U.S. Cl.
CPC ............ *G09G 3/3208* (2013.01); *G09G 3/2092* (2013.01); *G09G 2310/04* (2013.01); *G09G 2330/021* (2013.01); *G09G 2330/022* (2013.01); *G09G 2354/00* (2013.01)

(58) Field of Classification Search
CPC . G09G 3/3426; G09G 3/3208; G09G 3/3406; G09G 2323/0646; G09G 2360/16
USPC .................................................. 345/173, 76
See application file for complete search history.

(56) References Cited

U.S. PATENT DOCUMENTS

| | | | | |
|---|---|---|---|---|
| 6,654,036 | B1 * | 11/2003 | Jones ............................ | 715/798 |
| 7,389,432 | B2 * | 6/2008 | Chandley et al. ............ | 713/320 |
| 8,443,297 | B1 * | 5/2013 | Jitkoff et al. .................. | 715/795 |
| 2006/0087502 | A1 * | 4/2006 | Karidis et al. ................ | 345/211 |
| 2006/0132474 | A1 * | 6/2006 | Lam .............................. | 345/204 |
| 2008/0122798 | A1 | 5/2008 | Koshiyama et al. | |
| 2008/0277171 | A1 | 11/2008 | Wright | |
| 2009/0219255 | A1 | 9/2009 | Woolley et al. | |
| 2010/0129053 | A1 * | 5/2010 | Ito ................................. | 386/69 |
| 2010/0241887 | A1 | 9/2010 | Chang | |
| 2010/0299642 | A1 | 11/2010 | Merrell et al. | |
| 2010/0328361 | A1 * | 12/2010 | Kajiyama ..................... | 345/690 |
| 2011/0037576 | A1 * | 2/2011 | Jeon et al. ................... | 340/407.2 |
| 2011/0090257 | A1 * | 4/2011 | Ko et al. ...................... | 345/660 |
| 2013/0016046 | A1 * | 1/2013 | Chou et al. ................... | 345/173 |

* cited by examiner

*Primary Examiner* — Seokyun Moon
(74) *Attorney, Agent, or Firm* — Birch, Stewart, Kolasch & Birch, LLP

(57) ABSTRACT

An electronic device and a method of controlling a display lighting are disclosed. A display includes a plurality of light emitting devices. A memory unit is configured to store a message data. A control unit is configured to control to sense a user action requesting an integrated message display, access the message data from a storing device in response to the user action, determine a transmission time or a transmitting time of the accessed message data, determine an area to be turned on among a screen area in which the accessed message data to be displayed based on the determined transmission time or the determined transmitting time, display the accessed message data in a screen of the electronic device according to a result of the determination of the area.

17 Claims, 23 Drawing Sheets

FIG. 6
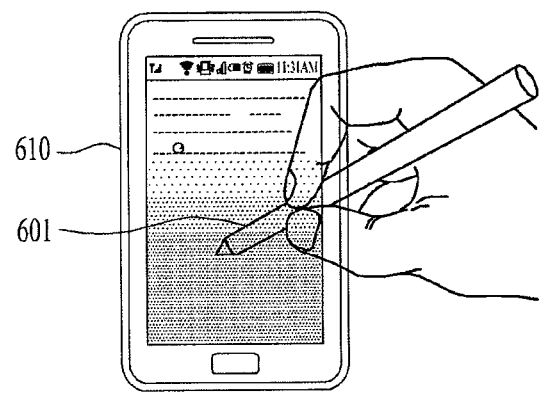
(a)
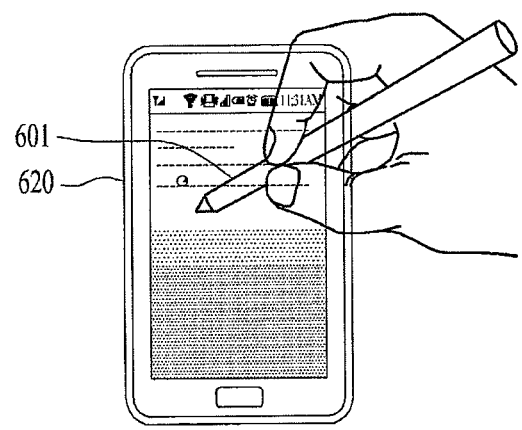
(b)
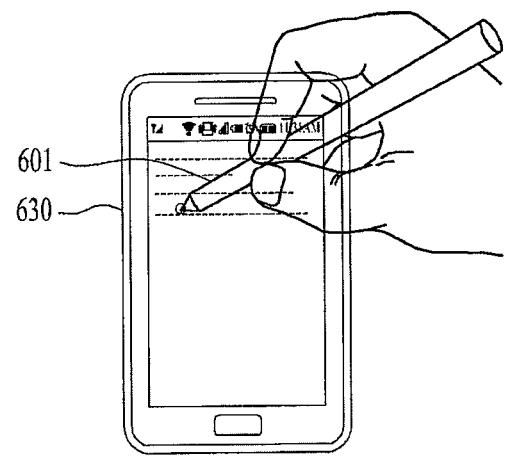
(c)

FIG. 7
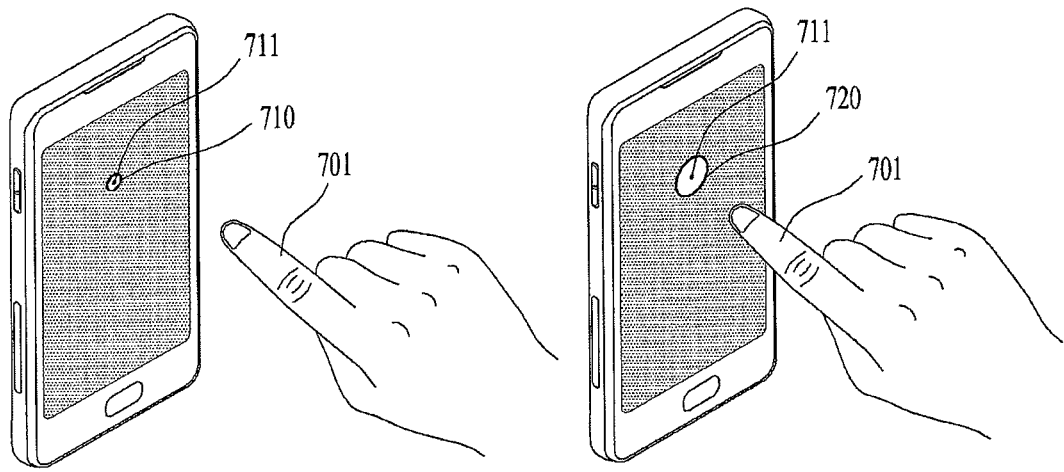
(a)  (b)
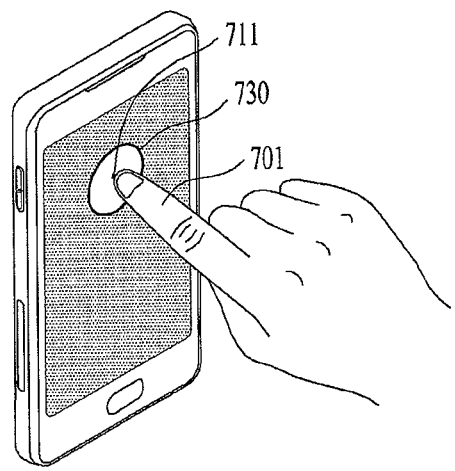
(c)

FIG. 9
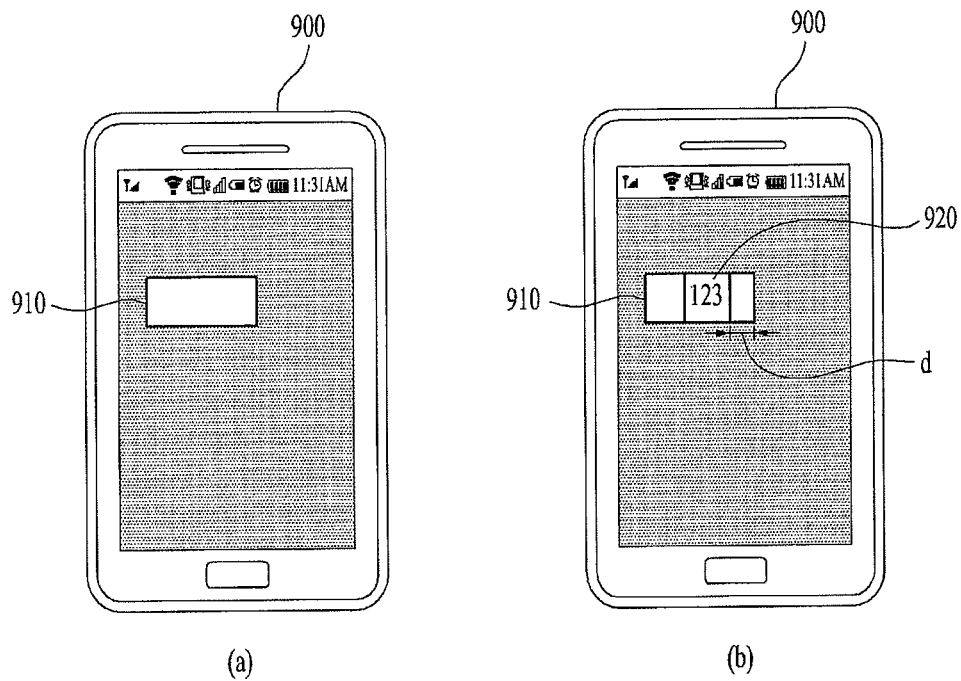
(a)  (b)
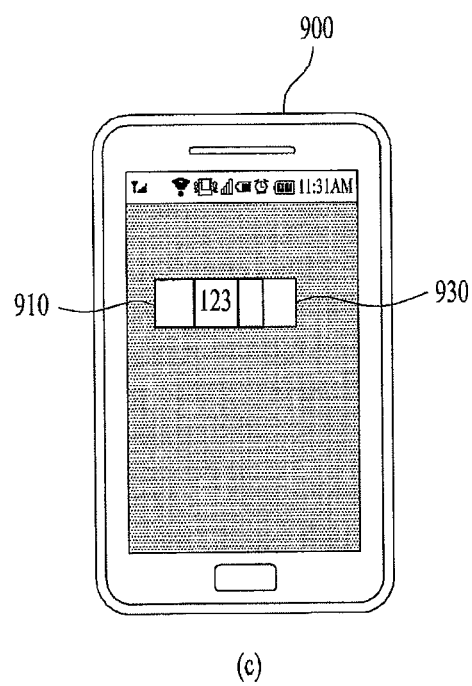
(c)

FIG. 13
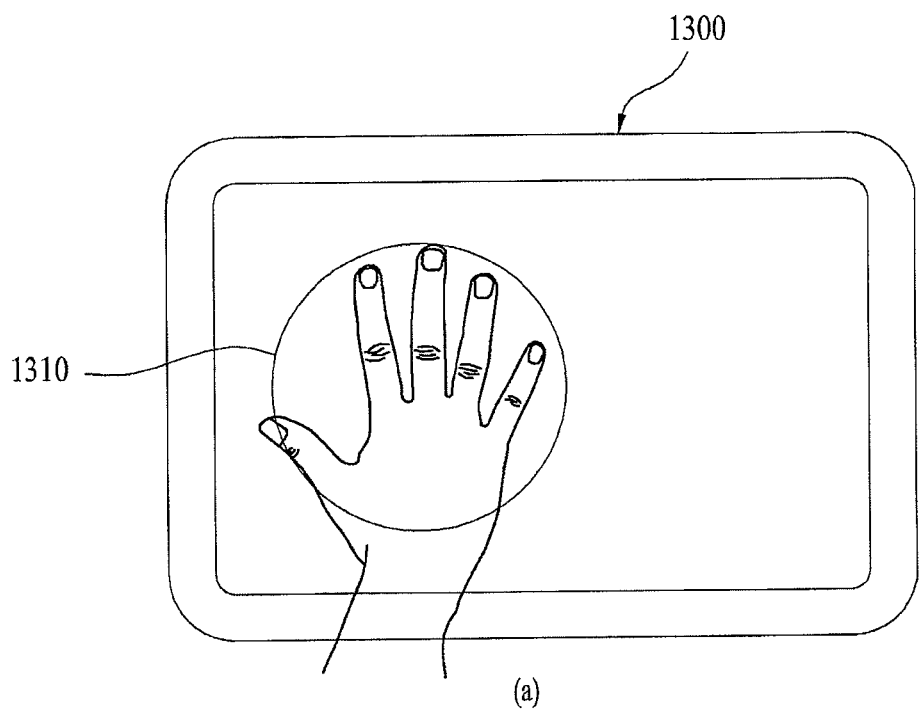
(a)
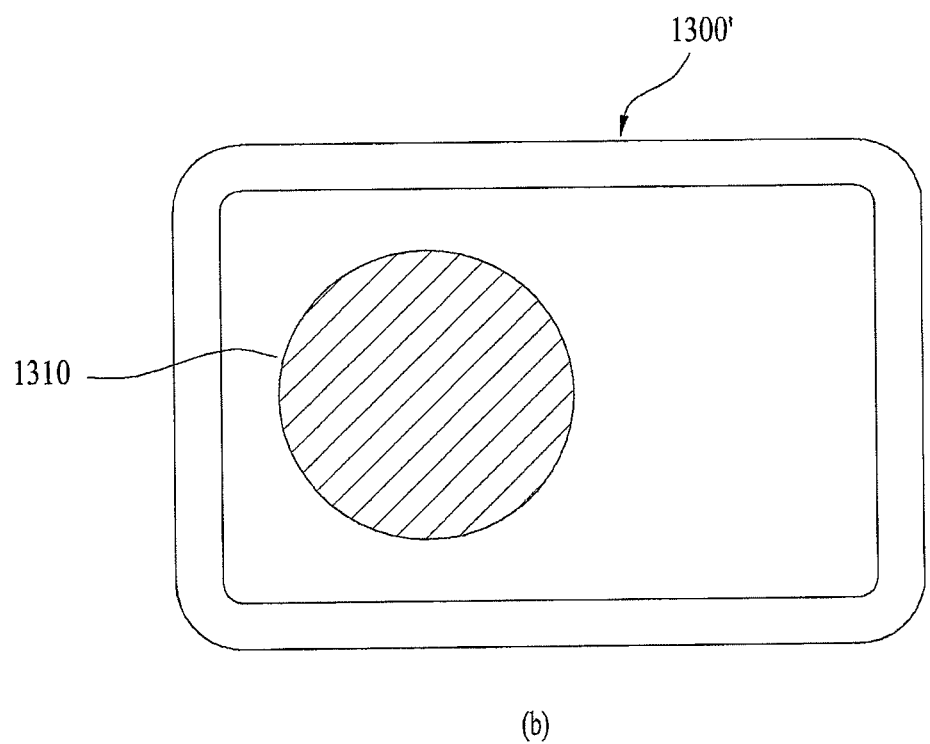
(b)

ELECTRONIC DEVICE AND METHOD OF CONTROLLING DISPLAY LIGHTING THEREOF

This application claims priority under 35 U.S.C. §119 to Korean Application No. 10-2012-0149858, filed on 20 Dec. 2012 which is hereby incorporated in its entirety by reference as if fully set forth herein.

BACKGROUND OF THE INVENTION

1. Field of the Invention

The present specification relates to an electronic device, more particularly, to a part of electronic device capable of lighting and a method of controlling a display lighting thereof.

2. Discussion of the Related Art

As energy conservation becomes a social issue, energy efficiency is being magnified in using an electronic device. In particular, the elongation of operation time and service life for such a mobile electronic device as a mobile terminal, a notebook, and the like is absolutely important in aspect of efficiently utilizing energy.

One of the most energy consuming modules in an electronic device corresponds to a display. According to a conventional display, a full screen is lighted when a user uses the display and the full screen is turned off when the user does not use the display for a prescribed time. The conventional display reduces power consumption in that way.

SUMMARY OF THE INVENTION

A technical task intended to achieve by the present invention is to provide an electronic device capable of suitably controlling a display lighting according to a use state of a user and a method of controlling the display lighting.

A different technical task intended to achieve by the present invention is to provide an electronic device enabling a user to use the electronic device without any trouble while using the electronic device with minimum power consumption and a method of controlling a display lighting.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the technical task, as embodied and broadly described, according to the present invention a method of controlling a display lighting of an electronic device includes the steps of sensing a user action by a sensor of the electronic device, predicting a screen area to be used on a display of the electronic device based on the sensed user action, and lighting a light emitting device of the display in an area corresponding to the predicted screen area. The screen area to be used can be predicted based on the screen area related to the sensed user action and a currently lighted screen area. The screen area to be used can be predicted based on the sensed user action and a previously sensed user action. A direction of the user action is determined based on the sensed user action and a previously sensed user action and the screen area to be used is predicted based on the determined direction. The screen area to be used is predicted further based on a displayed content.

If the user action corresponds to an approach of a touch object towards the electronic device, the screen area to be used is predicted based on a distance between the touch object and the electronic device. The touch object may be at least one selected from the group consisting of a finger, a hand, a palm, and a stylus.

If the user action corresponds to a touch on a screen of the display, a screen area including the sensed touch area is predicted as the screen area to be used.

The user action may correspond to a touch on a screen area, and the screen area predicting further includes determining whether the sensed touch area is situated within a prescribed distance with respect to a left boundary line or a right boundary line of a screen of the display, if the sensed touch area is situated within the prescribed distance, locating a screen line including the sensed touch area and an area including a prescribed screen line situated below of the screen line as the screen area to be used, and if the sensed touch area is not situated within the prescribed distance, locating the screen line including the sensed touch area as the screen area to be used.

To achieve another technical task, as embodied and broadly described, according to the present invention a method of controlling a display lighting includes sensing a user action requesting an integrated message display, accessing a message data from a storing device in response to the user action, determining a transmission time or a transmitting time of the accessed message data, determining an area to be turned on among a screen area in which the accessed message data is to be displayed based on the determined transmission time or the determined transmitting time, and displaying the accessed message data in a screen of the electronic device according to a result of the determination of the area.

The method of controlling a display lighting further includes sensing a user action requesting a scroll to see a previous message and lighting an entire light emitting device in response to the user action.

The determining of the area to be turned on includes determining a position of an input area in the screen area in which the accessed message data to be displayed and determining the checked input area as the area to be turned on.

The method of controlling a display lighting further includes sensing a user input inputting a data in the input area, determining a direction of which the inputted data is displayed, predicting a screen area to be turned on a display of the electronic device based on the determined direction, and lighting a light emitting device of the display in an area corresponding to the predicted screen area.

To further achieve another technical task, according to the present invention an electronic device include a display including a plurality of light emitting devices and a control unit configured to control to sense a user action, predict a screen area to be turned on the display based on the sensed user action, and light a light emitting device of the display in an area corresponding to the predicted screen area among the plurality of the light emitting devices.

To further achieve other technical task, according to the present invention an electronic device includes a display including a plurality of light emitting devices, a memory unit configured to store a message data, and a control unit configured to control to sense a user action requesting an integrated message display, access the message data from a storing device in response to the user action, determine a transmission time or a transmitting time of the accessed message data, determine an area to be turned on among a screen area in which the accessed message data to be displayed based on the determined transmission time or the determined transmitting time, and display the accessed message data in a screen of the display according to a result of the determination of the area.

BRIEF DESCRIPTION OF THE DRAWINGS

Arrangements and embodiments may be described in detail with reference to the following drawings in which like reference numerals refer to like elements and wherein:

FIG. 6 is a diagram of one embodiment for controlling brightness of a display according to an approach of a touch object;

FIG. 7 is a diagram of one embodiment for changing a lighting area of a display according to an approach of a touch object;

FIG. 9 is a diagram of one embodiment for changing a lighting area of a display according to a position to which a data is inputted;

FIG. 13 is a diagram of one embodiment for changing a lighting area of a display according to a palm touch detection;

DETAILED DESCRIPTION OF THE INVENTION

Figure 1:
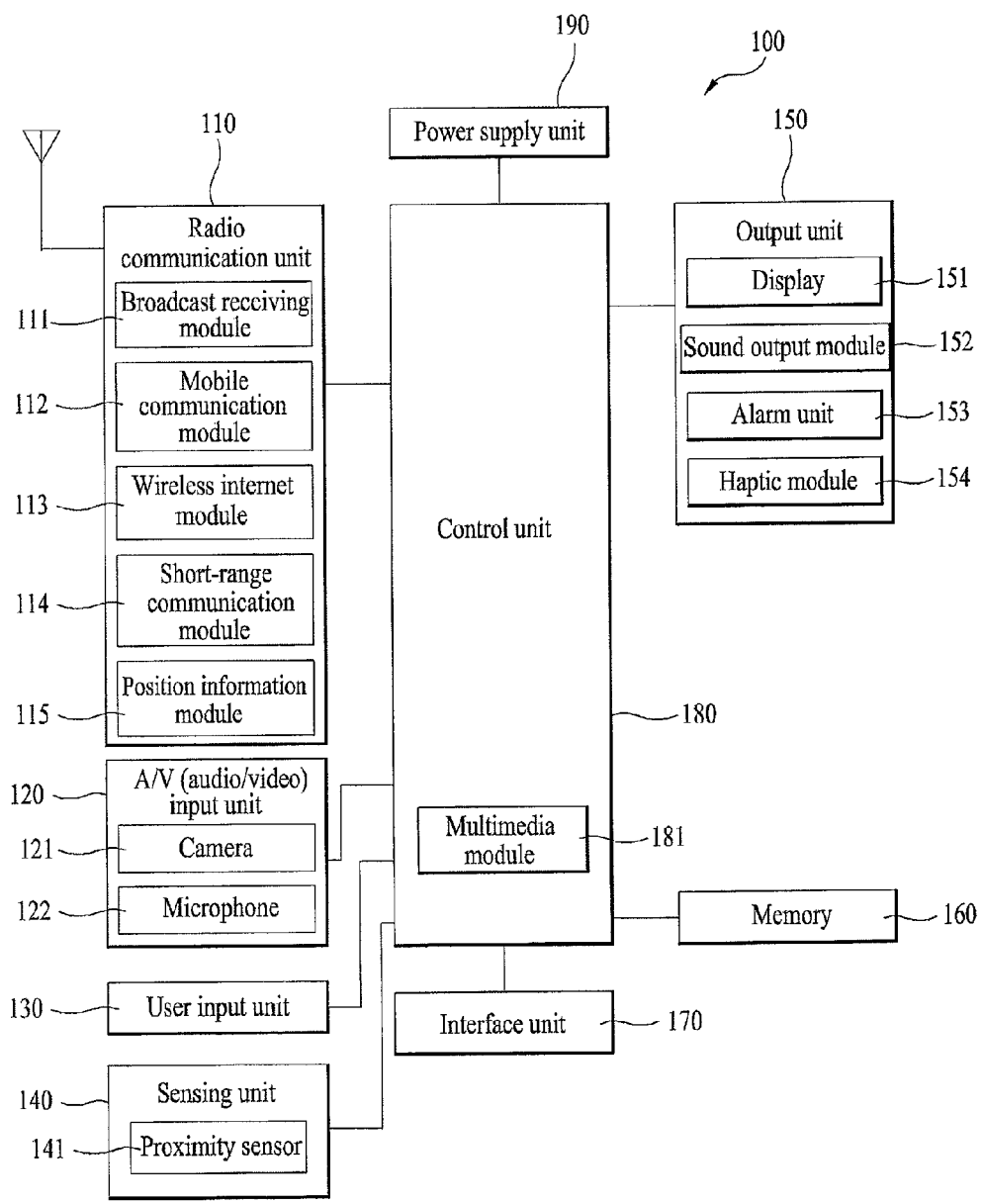
FIG. 1 is a block diagram of a configuration of a preferred one embodiment for an electronic device according to the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A suffix 'module' and 'unit' for a composing element in the following description is simply used for clarity of writing the present specification. Thus, the 'module' and the 'unit' can be used in a manner of being mixed.

Meanwhile, an electronic device described in the present specification, for instance, corresponds to an intelligent electronic device having a computer-aided function added to a broadcast receiving function. And, the electronic device may be equipped with such an easy-to-use interface as a handwritten input device, a touchscreen, a touchpad, a magic remote controller and the like in a manner of having an additional internet function while faithful to the broadcast receiving function. And, the electronic device may be able to perform such a function as e-mail, web-browsing, banking, game and the like in a manner of being connected to internet and computer with the support of a wire/wireless internet function. For these various functions, a standardized universal operating system (OS) can be used.

Hence, an electronic device described in the present invention, for instance, since various applications can be freely added or deleted on a general purpose OS kernel, various user-friendly functions can be performed. In particular, for instance, the electronic device may include one of a network TV, a hybrid broadcast broadband TV (HBBTV), a smart TV, an open hybrid TV (OHTV) and or the like. In some cases, the electronic device can be applied to a mobile terminal, a smart phone, a personal computer (PC), or an appliance as well.

Moreover, although the embodiment of the present invention is explained in detail with reference to the following attached drawings and the contents written on the drawings, the present invention may be non-limited by the embodiments.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

FIG. 1 is a block diagram of a configuration of a preferred one embodiment for an electronic device according to the present invention.

Referring to FIG. 1, an electronic device 100 may include a radio communication unit 110, an A/V (audio/video) input unit 120, a user input unit 130, a sensing unit 140, an output unit 150, a memory 160, an interface unit 170, a control unit 180, a power supply unit 190, and the like. Since the configuring elements depicted in FIG. 1 are not mandatory, an electronic device having more configuring element or less configuring element can be implemented.

The radio communication unit 110 may include at least one module enabling a radio communication between an electronic device 100 and a wireless communication system or between networks at which one electronic device 100 and another electronic device 100 are located. For instance, the radio communication unit 110 may be able to include a broadcast receiving module 111, a mobile communication module 112, a wireless internet module 113, a short-range communication module 114, a position information module 115, and the like.

The broadcast receiving module 111 receives a broadcast signal and/or a broadcast related information from an outer broadcasting management server on a broadcasting channel.

The broadcasting channel may be able to include a satellite channel and a terrestrial channel. The broadcasting management server may mean a server generating a broadcast signal and/or a broadcast related information and then transmitting the broadcast signal and/or the broadcast related information. Or, the broadcasting management server may mean a server transmitting a pre-generated broadcast signal and/or a broadcast related information to an electronic device in a manner of receiving the pre-generated broadcast signal and/or the broadcast related information. The broadcast signal may include a broadcast signal in a form of being combined a TV broadcast signal or a radio broadcast signal with a data broadcast signal as well as the TV broadcast signal, the radio broadcast signal, and the data broadcast signal.

The broadcast related information may mean the information related to a broadcast channel, a broadcast program, or a broadcast service provider. The broadcast related information can be provided by a mobile communication network. In this case, the broadcast related information can be received by the mobile communication module 112.

The broadcast related information may exist in a various forms. For instance, the broadcast related information may exist in a form of an EPG (electronic program guide) of a DMB (digital multimedia broadcasting), an ESG (electronic service guide) of a DVB-H (digital video broadcast-handheld), or the like.

For instance, the broadcast receiving module 111 may be able to receive a digital broadcasting signal using such a digital broadcasting system as a DMB-T (Digital Multimedia Broadcasting-Terrestrial), a DMB-S (Digital Multimedia Broadcasting-Satellite), a MediaFLO (Media Forward Link Only), a DVB-H (Digital Video Broadcast-Handheld), an ISDB-T (Integrated Services Digital Broadcast-Terrestrial), or the like. Of course, the broadcast receiving module 111 can be configured to fit to a different broadcasting system as well as the aforementioned digital broadcasting systems.

A broadcast signal and/or a broadcast related information received by the broadcast receiving module 111 can be stored in the memory 160.

The mobile communication module 112 transceives a radio signal with at least one of a base station, an external terminal, and a server in a mobile communication network. The radio signal may include an audio call signal, a video call signal, or various forms of data according to the transmission/reception of text/multimedia message.

The wireless internet module 113 indicates a module for a wireless internet access and may be equipped inside or outside of the electronic device 100. A wireless internet technology used for the wireless internet module may include a WLAN (wireless LAN), a Wibro (wireless broadband), a WIMAX (world interoperability for microwave access), a HSDPA (high speed downlink packet access), and the like.

The short-range communication module 114 indicates a module for a short-range communication. A Bluetooth, an RFID (radio frequency identification), an IrDA (infrared data association), an UWB (ultra wideband), a ZigBee, and the like can be used as a short-range communication technology.

The position information module 115 is a module to obtain a position of an electronic device. A representative example of the position information module is a GPS (global positioning system) module.

The A/V (audio/video) input unit 120 is a unit to input an audio signal or a video signal and may include a camera 121, a microphone 122, and the like. The camera 121 processes such a video frame as a still image, a video, and the like obtained by an image sensor in a video call mode or an image taking mode. A processed video frame can be displayed in a display 151.

The video frame processed by the camera 121 is stored in the memory 160 or can be transmitted to an outside of the device via the wireless communication unit 110. The camera 121 may be equipped with two or more cameras according to a use environment.

The microphone 122 receives a sound signal of external using a microphone in a call mode, a recording mode, a voice recognition mode, or the like, and then processes the sound signal into an electrical audio data. In case of the call mode, the processed audio data can be outputted in a manner of being transformed into a form of transmittable to a mobile communication base station via the mobile communication module 112. In the microphone 122, various noise rejection algorithms can be implemented to eliminate a noise occurred in a process of receiving the sound signal of external.

The user input unit 130 generates an input data for a user to control an operation of an electronic device. The user input unit 130 cab configured with a key pad, a dome switch, a touch pad (resistive or capacitive), a jog wheel, a jog switch, and the like.

The user interface unit 130 may include a sensor detecting a touch operation (hereinafter abbreviated touch sensor) and can be configured as a touch screen having a layer structure with the display 151 with each other. In particular, the user interface 130 and the display 151 can be integrated into one body. The touch sensor, for instance, may have a form of a touch film, a touch sheet, a touch pad, or the like.

The touch sensor can be configured to convert a pressure put on a specific area or a change of capacitance and the like occurred on a specific area into an electrical input signal. The touch sensor can be configured to detect even a pressure as well as a position and area when a touch is performed.

In case that there exists a touch input on a touch sensor, a corresponding signal (s) is transmitted to a touch controller (not depicted). The touch controller processes the signal (s) and then transmits a corresponding data to the control unit 180. Subsequently, the control unit 180 becomes aware of whether a certain area of the display 151 is touched or not.

The user interface unit 130 may further include a key pad, a dome switch, a touch pad (resistive or capacitive), a jog wheel, a jog switch, and the like.

The user interface unit 130 is designed to recognize at least one of a stylus, a palm of a user, or a finger of the user. The control unit 180 may be able to judge at least one of a position, a shape, or a size of a touched area according to a sensed result of the touch sensor included in the user interface unit 130.

The sensing unit 140 senses such a current state of an electronic device 100 as an open and close state of the electronic device 100, a position of the electronic device 100, existence and nonexistence of a user contact, a bearing of the electronic device, acceleration/reduction of the electronic device and the like and then generates a sensing signal to control an operation of the electronic device 100. For instance, in case that the electronic device 100 corresponds to a slide phone, the sensing unit may be able to sense whether the slide phone is opened or closed. And, the sensing unit may be able to sense whether power is supplied by the power supply unit 190 and whether the user interface unit 170 is connected to an external device and the like. Meanwhile, the sensing unit 140 may include a proximity sensor 141. The sensing unit 140 may include a gyroscope sensor, an acceleration sensor, a terrestrial magnetism sensor and the like.

The output unit 150 is a unit to generate an output related to a vision, hearing, a sense of touch, or the like. The output unit may include the display 151, a sound output module 152, an alarm unit 153, a haptic module 154, and the like.

The display 151 displays (outputs) the information processed in the electronic device 100. For instance, in case that the electronic device is in a call mode, the display displays an UI (user interface) or a GUI (graphic user interface) related to a call. In case that the electronic device is in a video call mode or an image taking mode, the display displays a taken and/or received video, the UI, or the GUI.

The display 151 may include at least one of a liquid crystal display (LCD), a thin film transistor-liquid crystal display (TFT LCD), an organic light-emitting diode (OLED), a flexible display, and a 3D display.

The display 151 may be able to turn on or turn off the light of a part of the display. The display may be able to turn on or off by a unit of light emitting device and may be able to turn on or off light emitting devices related to a prescribed screen area. In this case, the light emitting device related to a prescribed screen area may corresponds to a light emitting device lighting the prescribed screen area or a light emitting device located at the position related to the prescribed screen area. As one embodiment, the light emitting device may correspond to an OLED element. And, lighting up a screen area may mean to light up a light emitting device related to the corresponding screen area. Controlling a brightness of a screen area may mean to control a lightness or brightness of a light emitting device related to the corresponding screen area.

The display 151 may be able to turn on or off a light emitting device and may be able to control a brightness of the light emitting device in a manner of controlling a power supply or a quantity of power supply by a unit of light emitting device.

Some of the displays can be configured with a transparent type or a light penetrating type. This may be called a transparent display. A representative example of the transparent display may correspond to a TOLED (transparent OLED) and the like. A backside structure of the display 151 can be configured by a structure of the light penetrating type as well. With the help of this structure, a user may be able to see an object located at the back of a body of an electronic device via an area occupied by the display 151 of the body of the electronic device.

According to an implementation form of the electronic device 100, two or more displays 151 can exist. For instance, a plurality of displays can be arranged in one side of the electronic device 100 in a manner of being separated or integrated. Or, a plurality of the displays can be arranged in each side of the electronic device, respectively.

In case that the display 151 and a sensor sensing a touch operation (hereinafter abbreviated touch sensor) are making a layer structure with each other (hereinafter abbreviated touch screen), the display 151 can be used as an input device as well as an output device. The touch sensor can be included in the interface unit 130.

A proximity sensor 141 can be arranged in an internal area of an electronic device wrapped by the touch screen or arranged in the vicinity of the touch screen. The proximity sensor indicates a sensor detecting whether a prescribed object approaching to a detecting side or an object existing near the proximity sensor exists using power of electromagnetic field or an infrared light without a mechanical contact. The proximity sensor has a longer life than a contact sensor and its utilization is higher as well.

An example of the proximity sensor may include a through-beam photo sensor, a diffuse reflection photo sensor, a retro-reflective photo sensor, a high-frequency oscillation-type proximity sensor, a capacitive proximity sensor, a magnetic proximity sensor, an infrared proximity sensor, and the like. In case that the touch screen corresponds to a capacitive proximity sensor, the touch screen is configured to detect an approach of a pointer using a change of an electric field according to the approach of the pointer. In this case, the touch screen (touch sensor) may be classified into a proximity sensor.

For clarity, an action making the pointer, which approaches the touch screen and positions in the touch screen in a manner of not contacting the touch screen, to be identified in the touch screen called a proximity touch in the following description. On the other hand, the action actually touching the touch screen by the pointer called a contact touch. The position where the proximity touch is performed in the touch screen by the pointer means a position where the pointer vertically corresponds to the touch screen when the pointer performs the proximity touch.

The proximity sensor senses a proximity touch and a proximity touch pattern (e.g., proximity touch distance, proximity touch direction, proximity touch speed, proximity touch time, a proximity touch position, proximity touch moving state, and the like). The information corresponding to the sensed proximity touch operation and the proximity touch pattern can be displayed in the touch screen.

The sound output module 152 may be able to output an audio data received from the radio communication unit 110 in a call signal receiving mode, a call mode, a recording mode, a voice recognition mode, a broadcast receiving mode, or the like or stored in the memory 160. The sound output module 152 may be able to output a sound signal related to a function (e.g., a call signal reception sound, a message reception sound, and the like) performed in the electronic device 100. The sound output module 152 may include a receiver, a speaker, a buzzer, and the like.

The alarm unit 153 outputs a signal to alarm an occurrence of an event of the electronic device 100. An example of the event occurred in the electronic device may include a call signal reception, message reception, key signal input, a touch input, and the like. The alarm unit 153 may be able to output a signal to alarm an occurrence of event by a form of a vibration as well as a video signal or an audio signal. The video signal or the audio signal can be outputted by the display 151 or the sound output module 152. Hence, the display and the sound output module 151/152 can be classified into a part of the alarm unit 153.

The haptic module 154 generates a various kind of haptic effects that a user feels. A representative example of the haptic effects by which the haptic module 154 generates is a vibration. The strength, pattern, and the like of the vibration generated by the haptic module 154 can be controlled. For instance, a vibration can be outputted in a manner of combining vibrations different with each other and can be sequentially outputted.

The haptic module 154 may be able to generate such a various haptic effects as a pin arrangement performing a vertical movement for a contacted skin side, jet force or suction force of air via a nozzle or an intake, a brush for a skin surface, a contact of an electrode, an effect by a stimulus such as electrostatic power and the like, an effect generated by reproducing the sense of heat or cold using an element capable of absorbing or producing heat, and the like as well as a vibration.

The haptic module 154 may be able to deliver a haptic effect by a direct touch. Moreover, the haptic module may be implemented to feel a haptic effect via a muscle sense such as a finger, an arm, or the like. The haptic module 154 can be equipped with 2 or more haptic modules according to a configuration of the electronic device 100.

The memory 160 can store a program for an operation of the control unit 180 and may be able to temporarily store input/output data (e.g., a phonebook, a message, a still image, a video, and the like). The memory 160 may be able to store data on various patterns of vibrations and sounds outputted in case that a touch is inputted on the touch screen.

The memory 160 may be able to include at least one type of recording media among a flash memory type, a hard disk type, a multimedia card micro type, a card type memory (e.g., SD or XD memory, and the like), a RAM (random access memory), an SRAM (static random access memory), a ROM (read-only memory), an EEPROM (electrically erasable programmable read-only memory), a PROM (programmable read-only memory), a magnetic memory, a magnetic disk, and an optical disk. The electronic device 100 may operate in relation to web storage, which performs a storing function of the memory 160 on the internet.

The interface unit 170 plays a role of a path with all external devices connected to the electronic device 100. The interface unit 170 receives data from an external device, delivers power supply to each of the internal configuring elements of the electronic device 100, or enables internal data of the electronic device 100 to be transmitted to the external device. For instance, the interface unit 170 may include a wired/wireless headset port, an external charger port, a wired/wireless data port, a memory card port, a port connecting a device equipped with an identification module, an audio I/O (input/output) port, a video I/O (input/output) port, an earphone port, and the like.

The identification module corresponds to a chip stored various information to authenticate the use authority of the electronic device 100. The identification module may include a user identification module (UIM), a subscriber identification module (SIM), an universal subscriber identification module (USIM), and the like. The device equipped with an identification module (hereinafter abbreviated identification device) can be manufactured in a form of a smart card. Hence, the identification device can be connected to the electronic device 100 via a port.

In case that the electronic device 100 is connected to an external cradle, the interface unit 170 can be a path receiving power from the cradle to supply power to the electronic device 100 or can be a path delivering various command signals inputted by a user from the cradle to the electronic device 100. Various command signals inputted from the cradle or the power may be operated as a signal to recognize that the electronic device 100 is correctly installed.

The control unit 180 generally controls overall operations of the electronic device. For instance, the control unit performs a related control and a process for a voice call, a data communication, a video call, and the like. The control unit 180 may include a multimedia module 181 to play a multimedia. The multimedia module 181 can be implemented in the control unit 180 or can be implemented irrespective of the control unit 180.

The control unit 180 senses a user action and may be then able to control the electronic device 100 based on the sensed user action. The user action may include a selection on a physical button of a display device or a remote controller, an implementation of a prescribed touch gesture on a touch screen display, a selection on a soft button, an implementation of a prescribed spatial gesture recognized from an image taken by an image taking device, or an implementation of a prescribed voicing recognized by a voice recognition for the voice received by the microphone 122. The control unit 180 may be able to interpret the user action as at least one implementable command. In response to the at least one implementable command, the control unit 180 may be able to control the configuring element of the electronic device 100. In particular, the control unit 180 may be able to control an input/output between the components of the electronic device 100, data receiving and processing by using the at least one command.

The control unit 180 may be able to perform a pattern recognition processing capable of recognizing a hand writing input or a drawing input performed on the touch screen as a text or an image, respectively.

The power supply unit 190 supplies power necessary for each of the configuring elements to operate in a manner of being provided by an external power or an internal power by the control of the control unit 180.

Embodiments of the present invention can be implemented using various means. For instance, embodiments of the present invention can be implemented in a recording media readable by a computer or a computer like device using software, hardware, and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor, electronic unit to perform an extra function, and the like. In some cases, the embodiments of the present invention can be implemented by the control unit 180 by itself.

In case of the implementation by software, the embodiments such as procedures and functions described in the present specification can be implemented by separate software modules. Each of the software modules may be able to perform at least one function or operation described in the present specification. Software code can be implemented by a software application written by an appropriate programming language. The software code is stored in the memory 160 and can be implemented by the control unit 180.

Figure 2:
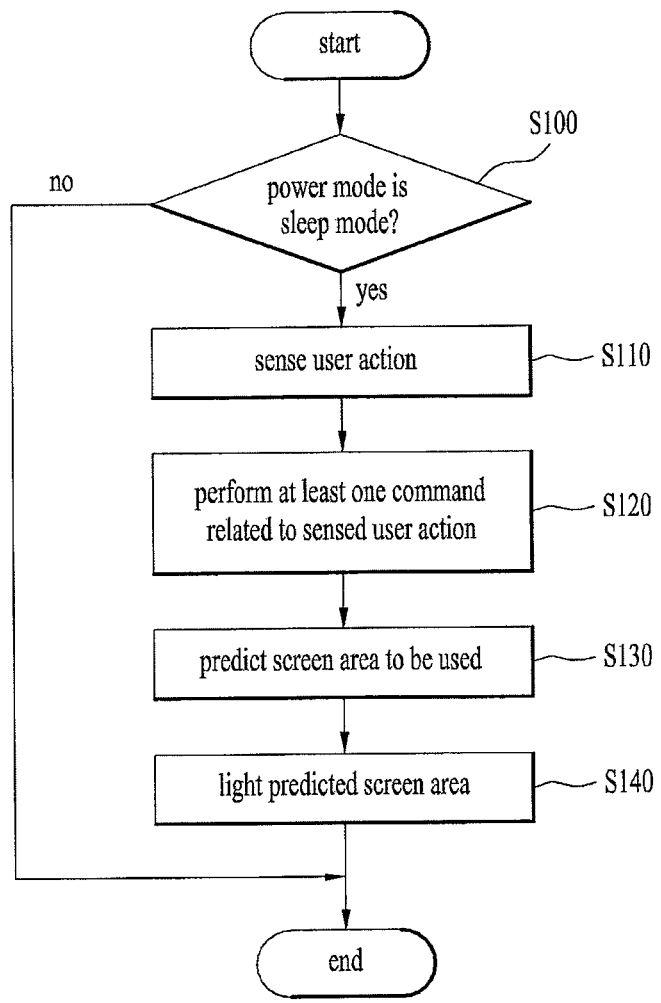
FIG. 2 is a flowchart for a performing process of a preferred one embodiment for a method of controlling a display lighting according to the present invention.
Figure 3:
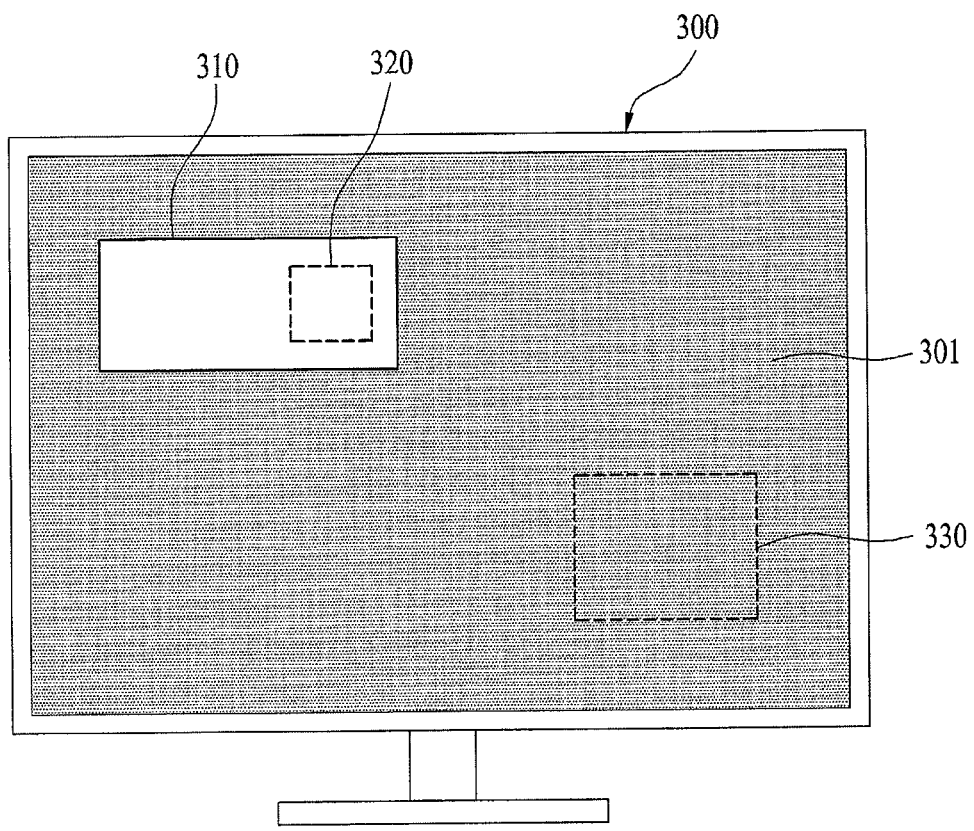
FIG. 3 is a diagram for one embodiment showing a screen lighted a part of the screen.
Figure 4:
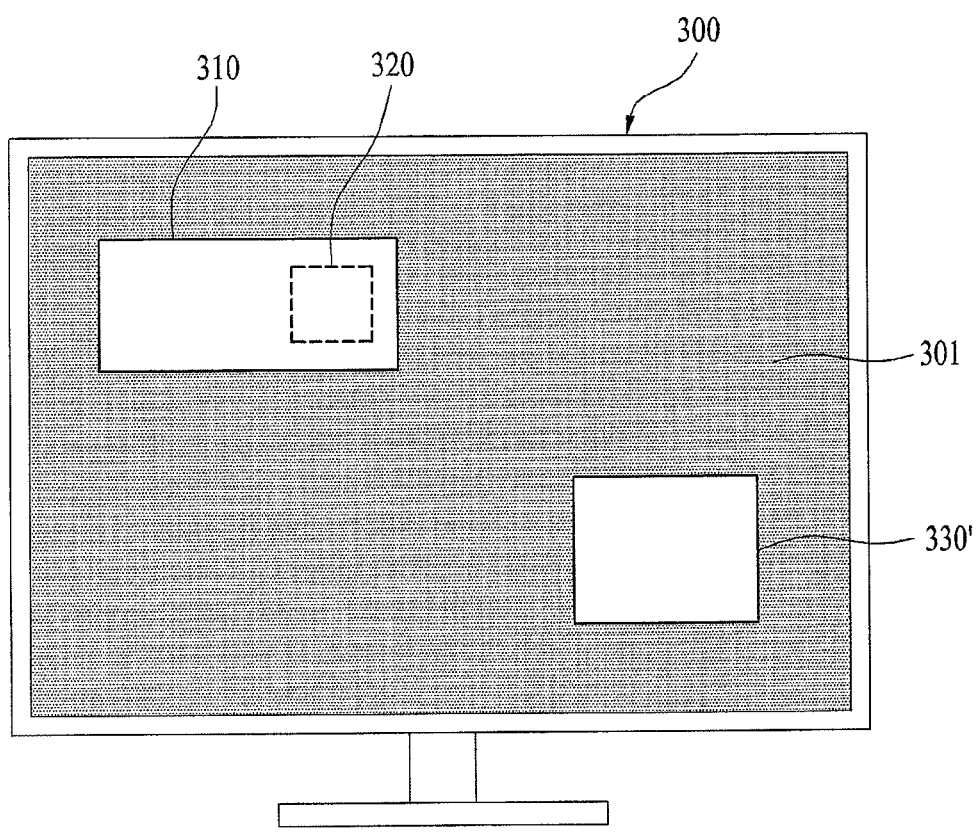
FIG. 4 is a diagram for showing a lighted screen area, which is predicted in FIG. 3 to be used.

FIG. 2 is a flowchart for a performing process of a preferred one embodiment for a method of controlling a display lighting according to the present invention, FIG. 3 is a diagram for one embodiment showing a screen lighted a part of the screen, and FIG. 4 is a diagram for showing a lighted screen area, which is predicted in FIG. 3 to be used.

Referring to FIG. 2 to FIG. 4, the control unit 180 checks a power mode of the electronic device 100 [S100]. The power mode may correspond to one of a normal mode and a sleep mode. The normal mode means that a full display is configured to operate to be turned on or turned off. The sleep mode means that a part of the display is configured to operate to be turned on or turned off. In case of the sleep mode, the electronic device 100 senses a user action [S110] and may be then able to perform [S120] to [S140] for the sensed user action.

Yet, in some cases, the control unit 180 omits the step 100, which corresponds to a step of checking the power mode of the electronic device 100, and may be then able to perform a next step 110, which corresponds to a step of sensing the user action.

In particular, in case of performing a prescribed $1^{st}$ function, the control unit 180 may be able to perform the step 110 of sensing the user action after completing the step 100 of checking the power mode of the electronic device 100. In case of performing a prescribed $2^{nd}$ function, the control unit may omit the step 100 of checking the power mode of the electronic device 100 and may be then able to perform the next step 110 of sensing the user action.

In this case, the $1^{st}$ function means a function that a user may have a trouble if the sleep mode, which is intended to turn on or turn off a part of the display, is implemented, such as a function of playing a video.

In particular, in case of implementing the sleep mode to reduce power consumption of an electronic device, since the $1^{st}$ function may give inconvenience to a user, the control unit performs the step 100, which is the step of checking the power mode of the electronic device, and may be then able to perform the step 110, which is the step of sensing the user action.

And, the $2^{nd}$ function means a function that a user does not feel inconvenience in case of performing the sleep mode, which is intended to turn on or turn off a part of the display, such as a text editor, writing a message, and the like.

In particular, since the $1^{st}$ function does not give any inconvenience to the user in case of implementing the sleep mode to reduce power consumption of an electronic device, the control unit omits the step 100, which corresponds to a step of checking the power mode of the electronic device, and may be then able to perform the step 110, which is the step of sensing the user action.

As a different case, in case of performing all functions including the $1^{st}$ and $2^{nd}$ function, the control unit 180 may be able to immediately perform the step 110, which corresponds to a step of sensing the user action, without performing the step 100, which corresponds to a step of checking the power mode of the electronic device.

In this case, the control unit always omits the step 100 of checking the power mode of the electronic device irrespective of the function of the electronic device and may be then able to perform the step 110 of sensing the user action immediately.

This case may be appropriate for an embodiment when a user should use an electronic device under an environment that power charge is difficult. This case may be able to reduce power consumption of the electronic device as much as possible and enable the electronic device to be used for a long time.

Subsequently, the control unit 180 senses a user action [S110].

The control unit 180 controls the electronic device 100 based on the sensed user action [S120].

The control unit 180 predicts a position of a $3^{rd}$ screen area 330 based on the sensed user action [S130]. In this case, the $3^{rd}$ screen area 330 may be a part of the screen or a full screen as shown in FIG. 3.

In this case, the $3^{rd}$ screen area means a screen area on which the control unit intends to light in a manner of predicting in advance.

As an embodiment, the control unit 180 may be able to predict the position of the $3^{rd}$ screen area 330 based on a currently lighted $1^{st}$ screen area 310 and a $2^{nd}$ screen area 320 related to the user action. The $2^{nd}$ screen area 320 may be an area touched by a touch object. In this case, the control unit 180 may be able to predict the position of the $3^{rd}$ screen area 330 based on a distance between a boundary line of the $1^{st}$ screen area 310 and the boundary line of the $2^{nd}$ screen area 320. The touch object may include at least one selected from the group consisting of a finger, a hand, a palm, and a stylus.

For instance, the control unit calculates a $1^{st}$ distance between the boundary line of the $1^{st}$ screen area 310 and the boundary line of the $2^{nd}$ screen area 320.

And, the control unit may be configured to put some distance between the $3^{rd}$ screen area and the boundary line of the $1^{st}$ screen area as the calculated $1^{st}$ distance is approaching.

And, the control unit may be configured to make the $3^{rd}$ screen area to be closed to the boundary line of the $1^{st}$ screen area as the calculated $1^{st}$ distance increases.

As an embodiment, the control unit 180 may be able to predict the position of the $3^{rd}$ screen area 330 based on a currently sensed user action and a previously sensed user action. In this case, the control unit 180 checks a direction between the currently sensed user action and the previously sensed user action and may be then able to predict the position of the $3^{rd}$ screen area 330 based on the checked direction.

For instance, the control unit may be able to determine the position of the $3^{rd}$ screen area according to such a direction of the user action as the direction of display touch of a user, the direction of data input of the user, or the like.

In particular, the control unit may be able to determine the position of the $3^{rd}$ screen area to be positioned in a horizontal direction if a direction of a user action corresponds to the horizontal direction heading from the left to the right or from the right to the left.

And, the control unit may be able to determine the position of the $3^{rd}$ screen area to be positioned in a vertical direction if a direction of a user action corresponds to the vertical direction heading from the top to the bottom or from the bottom to the top.

As a different case, the control unit may be able to determine the position of the $3^{rd}$ screen area to be positioned in a diagonal direction if a direction of a user action corresponds to the diagonal direction between the horizontal direction and the vertical direction.

And, if a direction of a currently sensed user action and the direction of a previously sensed user action are identical with each other, the control unit 180 may be able to deter mine the position of the $3^{rd}$ screen area 330 based on the identical direction.

In this case, if the direction of the user action is contiguously identical more than one time, the control unit may be able to determine the position of the $3^{rd}$ screen area 330 in the corresponding direction.

As one embodiment, the control unit 180 may be able to predict the position of the $3^{rd}$ screen area 330 based on a content to be displayed. The control unit 180 checks a data region in the screen in which the content to be displayed. The control unit may be able to control to turn on the light of the screen area displaying the checked data region and may be able to control to turn off the light of the rest of the screen area. In this case, the $3^{rd}$ screen area 330 may correspond to the screen area displaying the data region.

Subsequently, the control unit turns on a light emitting device of the display related to the $3^{rd}$ screen area 330 [S140]. In this case, the control unit may be able to make pixels situated at inside of the $3^{rd}$ screen area 330 operate only. As shown in FIG. 4, the $3^{rd}$ screen area 330' can be turned on. As a part of embodiment, a whole or a part of the $1^{st}$ screen area 310 shown in FIG. 3 can be turned off. The $2^{nd}$ screen area 320 related to a user action shown in FIG. 3 can be turned off.

Figure 5:
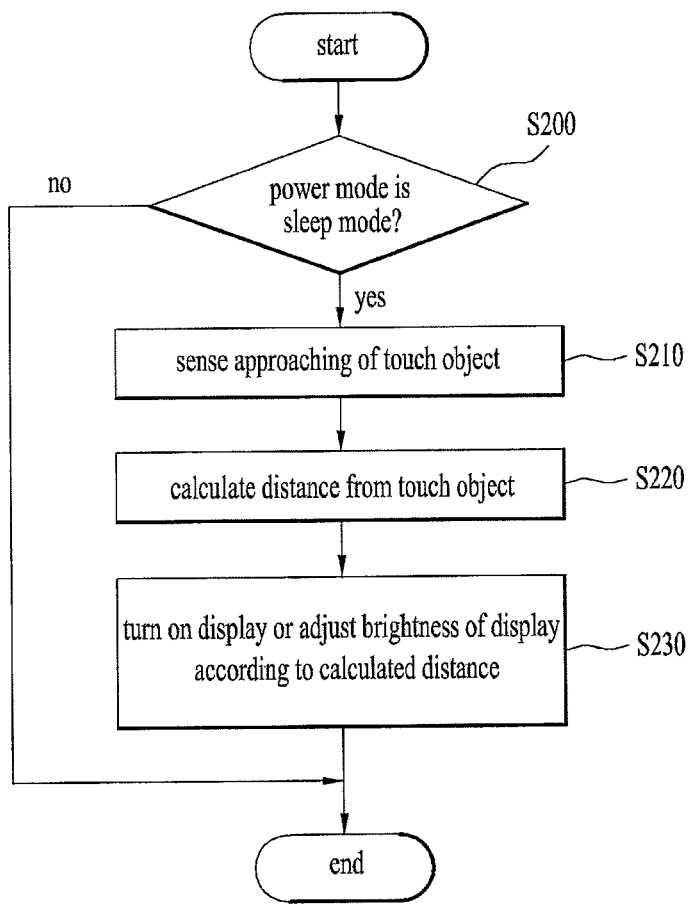
FIG. 5 is a flowchart for a performing process of another preferred embodiment for a method of controlling a display lighting according to the present invention.

FIG. 5 is a flowchart for a performing process of another preferred embodiment for a method of controlling a display lighting according to the present invention, FIG. 6 is a diagram of one embodiment for controlling brightness of a display according to an approach of a touch object, and FIG. 7 is a diagram of one embodiment for changing a lighting area of a display according to an approach of a touch object.

Referring to FIG. 5 to FIG. 7, the control unit 180 checks a power mode of the electronic device 100. In case of a sleep mode, the electronic device 100 may be able to perform a step S220 to a step 230 for an approach of a touch object sensed in the step S210.

Yet, in some cases, the control unit 180 omits the step 200, which corresponds to a step of checking the power mode of the electronic device 100, and may be then able to perform a next step 210, which corresponds to a step of sensing the approach of the touch object.

In particular, in case of performing a prescribed $1^{st}$ function, the control unit 180 may be able to perform the step 210 of sensing the approach of the touch object after completing the step 200 of checking the power mode of the electronic device 100. In case of performing a prescribed $2^{nd}$ function, the control unit may omit the step 200 of checking the power mode of the electronic device 100 and may be then able to perform the next step 210 of sensing the approach of the touch object.

As a different case, in case of performing all functions, the control unit 180 may be able to immediately perform the step 210, which corresponds to a step of sensing the approach of the touch object, without performing the step 200, which corresponds to a step of checking the power mode of the electronic device.

Subsequently, the proximity sensor 141 senses an approach of a touch object [S210].

The control unit 180 calculates a distance between the touch object and the electronic device 100 based on a signal sensed by the proximity sensor 141 [S220].

The control unit 180 controls a lighting of the display 151 or adjustment of brightness of the display according to the calculated distance [S230].

As one embodiment, if the calculated distance is greater than a $1^{st}$ setting distance, the control unit 180 may be able to maintain the display 151 in a state of being turned off. If the calculated distance is equal to the $1^{st}$ setting distance, less than the $1^{st}$ setting distance, and greater than a $2^{nd}$ setting distance, the control unit 180 may be able to control the brightness of the display 151 to be adjusted to $1^{st}$ brightness 610. If the calculated distance is equal to the $2^{nd}$ setting distance, less than the $2^{nd}$ setting distance, and greater than '0', the control unit 180 may be able to control the brightness of the display 151 to be adjusted to $2^{nd}$ brightness 620. If the calculated distance corresponds to '0', in other word, if the touch object 601 touches the display 150, the control unit 180 may be able to control the brightness of the display 151 to be adjusted to $3^{rd}$ brightness 630. As one example, the $3^{rd}$ brightness 630 may be a normal brightness. In particular, the $3^{rd}$ brightness 630 may correspond to one of a brightness configured at the time of manufacturing the electronic device 100, a maximum brightness of the display 150, and a brightness configured according to an environment setting of the display. As one example, the $2^{nd}$ brightness 620 can be configured as 80% of the $3^{rd}$ brightness 630 and the $1^{st}$ brightness 610 can be configured as 50% of the $3^{rd}$ brightness 630. And, as one example, the $1^{st}$ setting distance can be configured by 10 cm and the $2^{nd}$ setting distance can be configured by 5 cm.

As one embodiment, if the calculated distance is greater than the $1^{st}$ setting distance, the control unit 180 may be able to maintain the display 151 in a state of being turned off. If the calculated distance is equal to the $1^{st}$ setting distance, less than the $1^{st}$ distance, and greater than the $2^{nd}$ setting distance, the control unit 180 may be able to control a screen area 710 related to a position of the touch object 701 to be turned on. A $5^{th}$ screen area 710 can be set on the basis of a point 711 of the display 151 situated at an optimized distance from the touch object 701. If the calculated distance is equal to the $2^{nd}$ setting distance, less than the $2^{nd}$ setting distance, and greater than '0', the control unit 180 may be able to expand the $5^{th}$ screen area 710 to a $6^{th}$ screen area 720. If the calculated distance corresponds to '0', in other word, if the touch object touches the display 150, the control unit 180 may be able to expand the $5^{th}$ screen area 720 to a $6^{th}$ screen area 730, or may be able to turn on the full screen.

Figure 8:
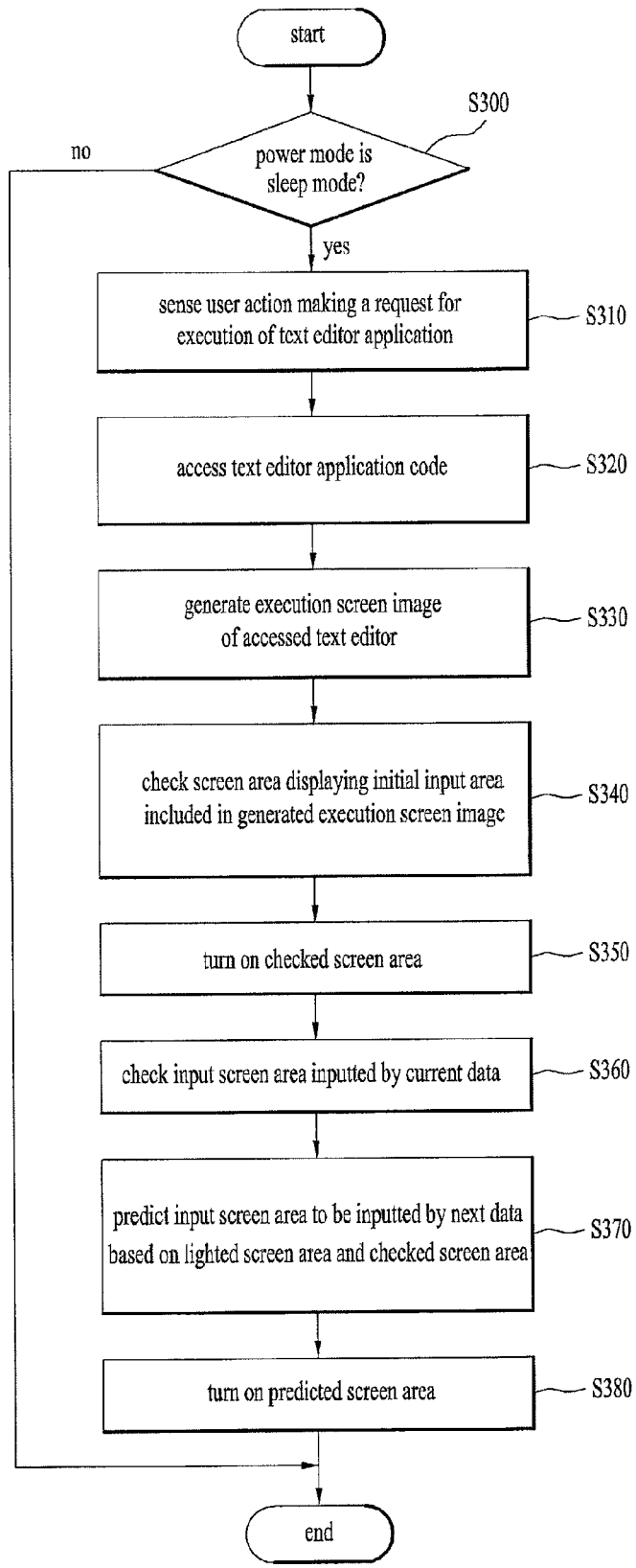
FIG. 8 is a flowchart for a performing process of another preferred embodiment for a method of controlling a display lighting according to the present invention.

FIG. 8 is a flowchart for a performing process of another preferred embodiment for a method of controlling display lighting according to the present invention and FIG. 9 is a diagram of one embodiment for changing a lighting area of a display according to a position to which a data is inputted.

Referring to FIG. 8 to FIG. 9, the control unit 180 checks a power mode of the electronic device 100. In case of a sleep mode, the electronic device 100 may be able to perform a step S320 to a step 380 for a user action sensed in the step S301.

Yet, in some cases, the control unit 180 omits the step 300, which corresponds to a step of checking the power mode of the electronic device 100, and may be then able to perform a next step 310, which corresponds to a step of sensing the user action making a request for an execution of a text editor application.

In particular, in case of performing a prescribed $1^{st}$ function, the control unit 180 may be able to perform the step 310 of sensing the user action making a request for the execution of a text editor application after completing the step 300 of checking the power mode of the electronic device 100. In case of performing a prescribed $2^{nd}$ function, the control unit may omit the step 300 of checking the power mode of the electronic device 100 and may be then able to perform the next step 310 of sensing the user action making a request for the execution of a text editor application.

As a different case, in case of performing all functions, the control unit 180 may be able to immediately perform the step 310, which corresponds to a step of sensing the user action making a request for an execution of a text editor application, without performing the step 300, which corresponds to a step of checking the power mode of the electronic device.

Subsequently, the control unit 180 senses a user action making a request for an execution of a text editor application [S310].

The control unit 180 accesses the execution of the text editor application from the memory 160 [S320]. The text editor application may include an application capable of writing a memo, document, and the like, an app, or a web app.

The control unit 180 generates an execution screen image of an accessed text editor [S330].

The control unit 180 checks a $9^{th}$ screen area 910 displaying an initial data input area, which included in the generated execution screen image [S340]. In this case, the initial data input area can be designated to a default position or can be designated to the position to which data is inputted lastly in a previous execution.

The control unit 180 turns on the checked $9^{th}$ screen area 910 [S350]. In this case, the rest area of the screen 900 may be turned off.

The control unit 180 checks a $10^{th}$ screen area to which a current data is inputted [S360].

The control unit 180 predicts an $11^{th}$ screen area 930 to which a next data to be inputted based on the $9^{th}$ screen area 910 and the $10^{th}$ screen area 920 [S370].

In this case, the control unit 180 may be able to predict the 11$^{th}$ screen area 930 based on a distance (d) between a boundary line of the 9$^{th}$ screen area 910 and the 10$^{th}$ screen area.

In this case, the 11$^{th}$ screen area means a screen area that the control unit intends to turn on in a manner of predicting in advance.

In particular, the control unit 180 checks an input direction of data and may be then able to predict the 11$^{th}$ screen area 930 based on the checked input direction and the distance (d). For instance, as shown in FIG. 9(b), in case that a number is inputted like 1,2, and 3, the control unit 180 may be able to check that the input direction is heading from the left to the right.

As a different case, in case that a number is inputted like 3,2, and 1, the control unit 180 may be able to check that the input direction is heading from the right to the left.

As one embodiment, if the 10$^{th}$ screen area 920 is situated within a prescribed distance with a left or right boundary line of a screen 900, a part of area of one line below or above in the 10$^{th}$ screen area 920 can be predicted as the 11$^{th}$ screen area 930. As one example, the prescribed distance can be configured with one character space. For instance, if the checked input direction is heading from the left to the right and the 10$^{th}$ screen area 920 is situated within the prescribed distance with the right boundary line, a part of the area one line below or above in the 10$^{th}$ screen area 920 can be predicted as the 11$^{th}$ screen area 930.

The control unit 180 turns on the predicted 11$^{th}$ screen area 930 [S380]. In this case, a part of the area of the 11$^{th}$ screen area 930 may overlap the 9$^{th}$ screen area 910, which is turned on. As a part of embodiment, the 9$^{th}$ screen area 910 can be turned off in the step S380.

Figure 10:
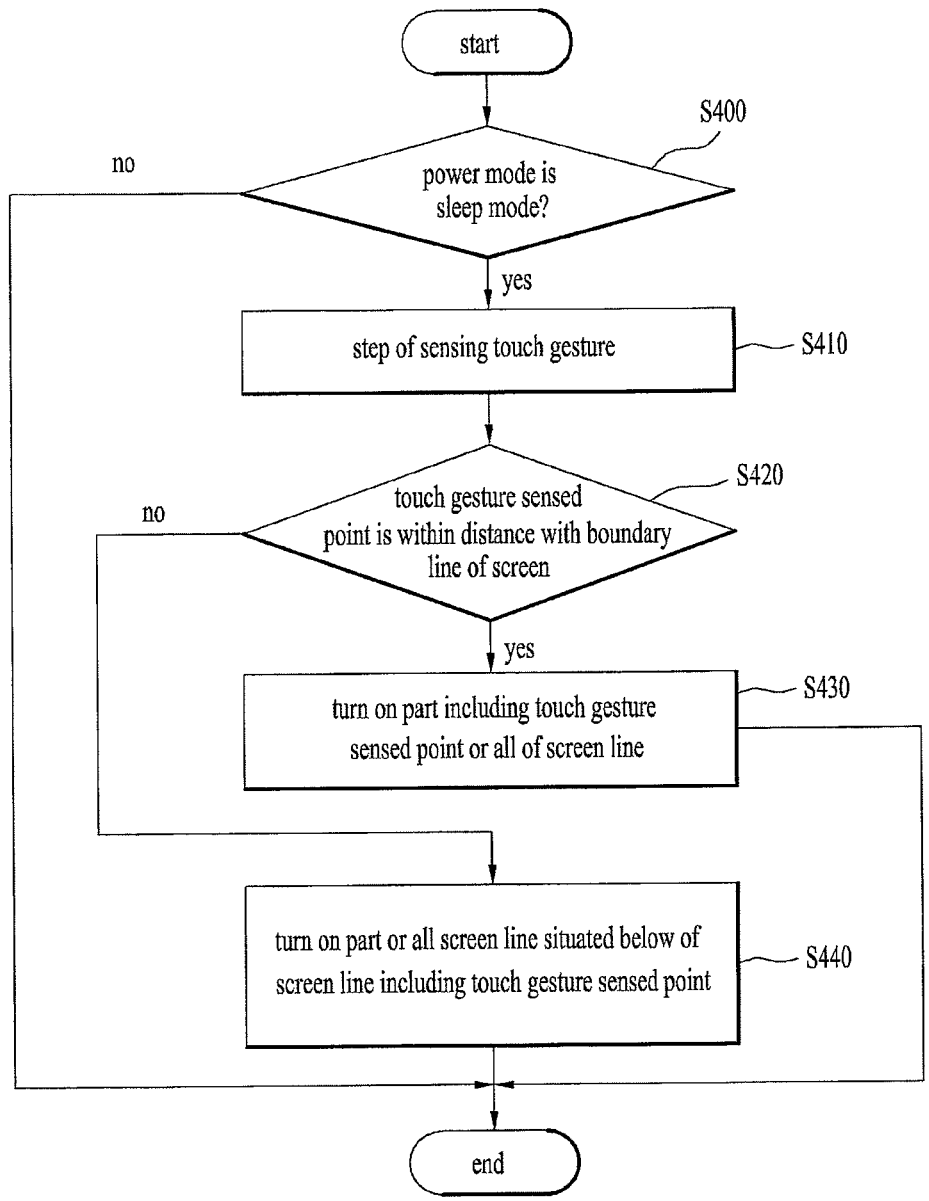
FIG. 10 is a flowchart for a performing process of another preferred embodiment for a method of controlling a display lighting according to the present invention.
Figure 11:
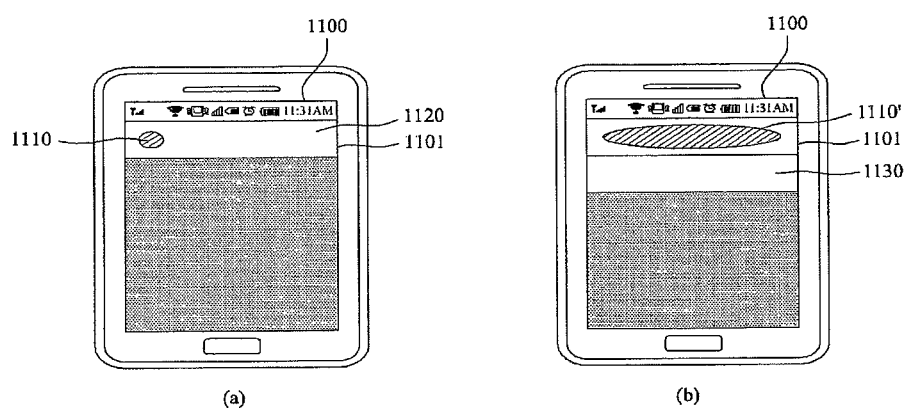
FIG. 11 is a diagram of one embodiment for changing a lighting area of a display according to a touch position.

FIG. 10 is a flowchart for a performing process of another preferred embodiment for a method of controlling display lighting according to the present invention and FIG. 11 is a diagram of one embodiment for changing a lighting area of a display according to a touch position.

Referring to FIG. 10 and FIG. 11, the control unit 180 checks a power mode of the electronic device 100 [S400]. In case of a sleep mode, the electronic device 100 may be able to perform a step S420 to a step 440 for a touch gesture sensed in the step S410.

Yet, in some cases, the control unit 180 omits the step 400, which corresponds to a step of checking the power mode of the electronic device 100, and may be then able to perform a next step 410, which corresponds to a step of sensing a touch gesture touching a screen 1000.

In particular, in case of performing a prescribed 1$^{st}$ function, the control unit 180 may be able to perform the step 410 of sensing the touch gesture touching the screen 1100 after completing the step 400 of checking the power mode of the electronic device 100. In case of performing a prescribed 2$^{nd}$ function, the control unit may omit the step 400 of checking the power mode of the electronic device 100 and may be then able to perform the next step 410 of sensing the touch gesture touching the screen 1100.

As a different case, in case of performing all functions, the control unit 180 may be able to immediately perform the step 410, which corresponds to a step of sensing the touch gesture touching the screen 1100, without performing the step 400, which corresponds to a step of checking the power mode of the electronic device 100.

Subsequently, the control unit 180 senses a touch gesture touching a screen 1100 [S410].

The control unit 180 checks whether a point 1110/1110' where the touch gesture is sensed is within a prescribed distance with a boundary line 1101 of the screen [S420].

In this case, the boundary line may be a right side boundary line of the screen or may be a left side boundary line of the screen as occasion demands.

As a different case, the boundary line may be a top boundary line of the screen or may be a bottom boundary line of the screen as occasion demands.

In case 1110 that the point where the touch gesture is sensed is not within a prescribed distance with the boundary line of the screen, the control unit controls a part or a whole of a screen line 1120 including the point where the touch gesture is sensed to be turned on [S430]. As one example, the prescribed distance may be one character space.

In case 1110' that the point where the touch gesture is sensed is within a prescribed distance with the boundary line of the screen, the control unit 180 controls a part or a whole of a screen line 1130 located at the below of the screen line including the point where the touch gesture is sensed to be turned on [S440].

Figure 12:
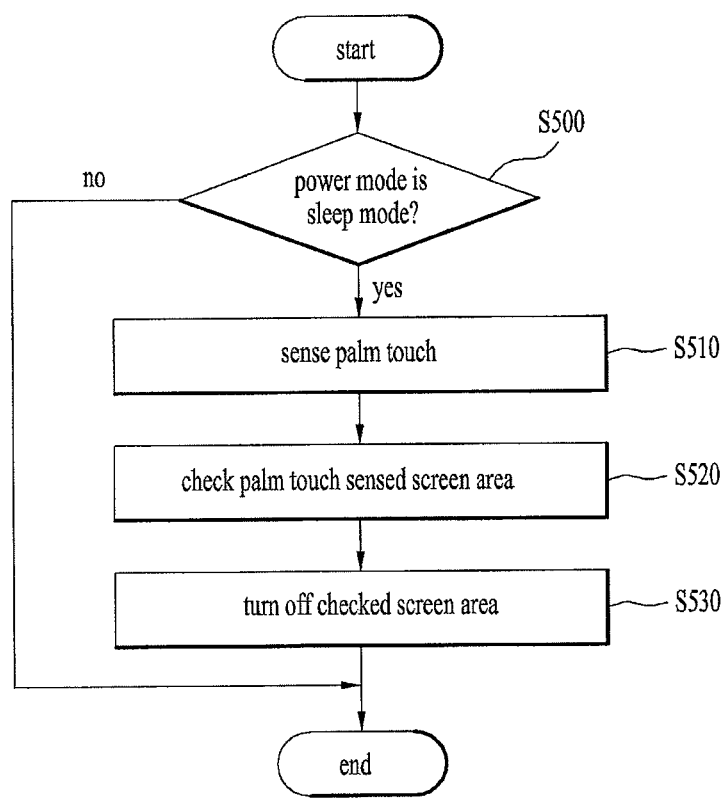
FIG. 12 is a flowchart for a performing process of another preferred embodiment for a method of controlling a display lighting according to the present invention.

FIG. 12 is a flowchart for a performing process of another preferred embodiment for a method of controlling a display lighting according to the present invention and FIG. 13 is a diagram of one embodiment for changing a lighting area of a display according to a palm touch sensing.

Referring to FIG. 12 and FIG. 13, the control unit 180 checks a power mode of the electronic device 100 [S500]. In case of a sleep mode, the electronic device 100 may be able to perform a step S520 to a step 530 for a user action sensed in the step S510.

Yet, in some cases, the control unit 180 omits the step 500, which corresponds to a step of checking the power mode of the electronic device 100, and may be then able to perform a next step 510, which corresponds to a step of sensing a palm touch touching a screen 1300.

In particular, in case of performing a prescribed 1$^{st}$ function, the control unit 180 may be able to perform the step 510 of sensing the palm touch touching the screen 1300 after completing the step 500 of checking the power mode of the electronic device 100. In case of performing a prescribed 2$^{nd}$ function, the control unit may omit the step 500 of checking the power mode of the electronic device 100 and may be then able to perform the next step 510 of sensing the palm touch touching the screen 1300.

As a different case, in case of performing all functions, the control unit 180 may be able to immediately perform the step 510, which corresponds to a step of sensing the palm touch touching the screen 1300, without performing the step 500, which corresponds to a step of checking the power mode of the electronic device 100.

Subsequently, the control unit 180 senses a palm touch touching a screen 1300 [S510].

The control unit 180 checks a screen area 1310 that the palm touch is sensed [S520].

The control unit 180 turns off the checked screen area 1310 [S530]. A screen 1300' shows that the screen area 1310 is turned off.

Figure 14:
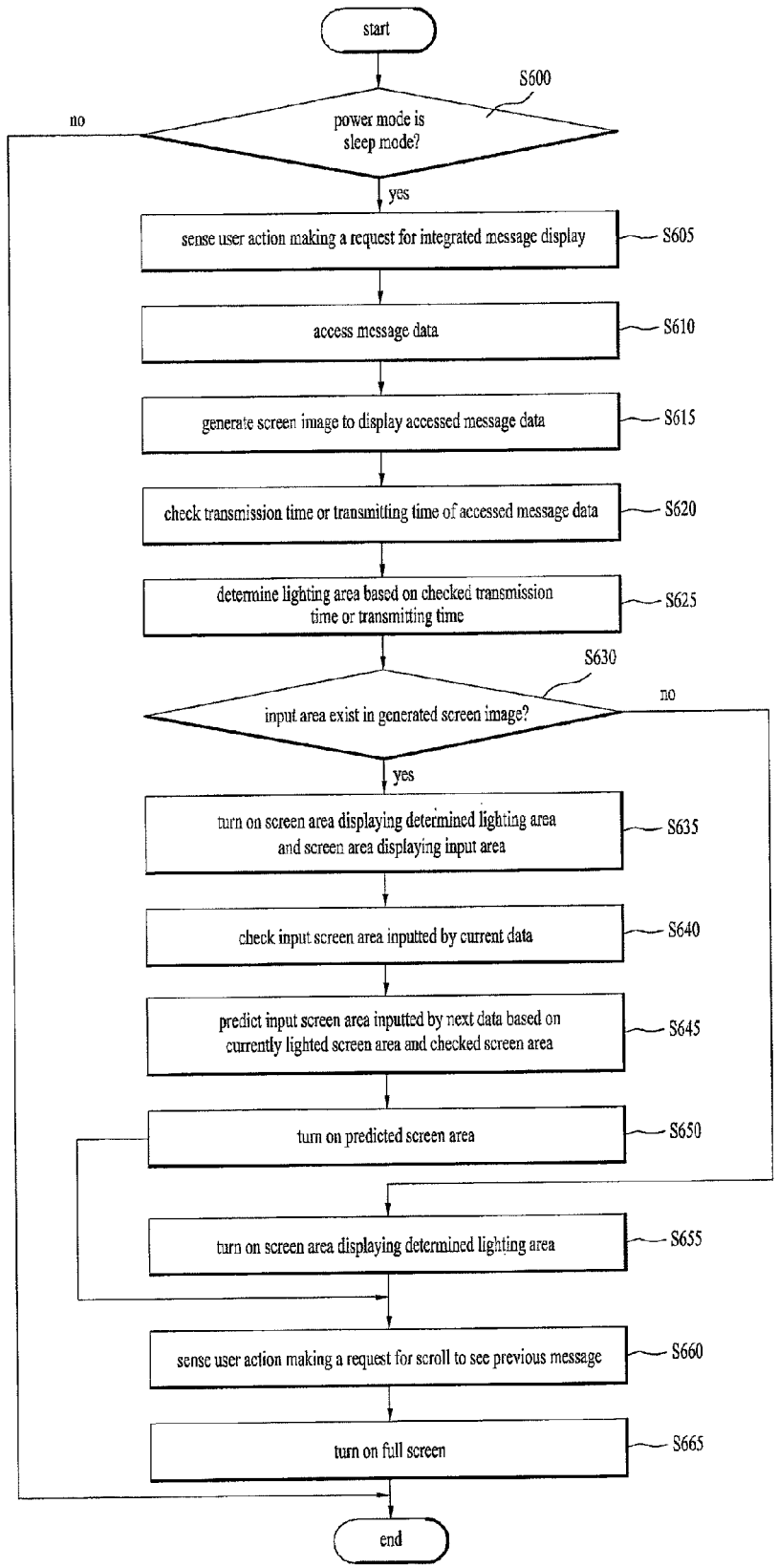
FIG. 14 is a flowchart for a performing process of another preferred embodiment for a method of controlling a display lighting according to the present invention.
Figure 15:
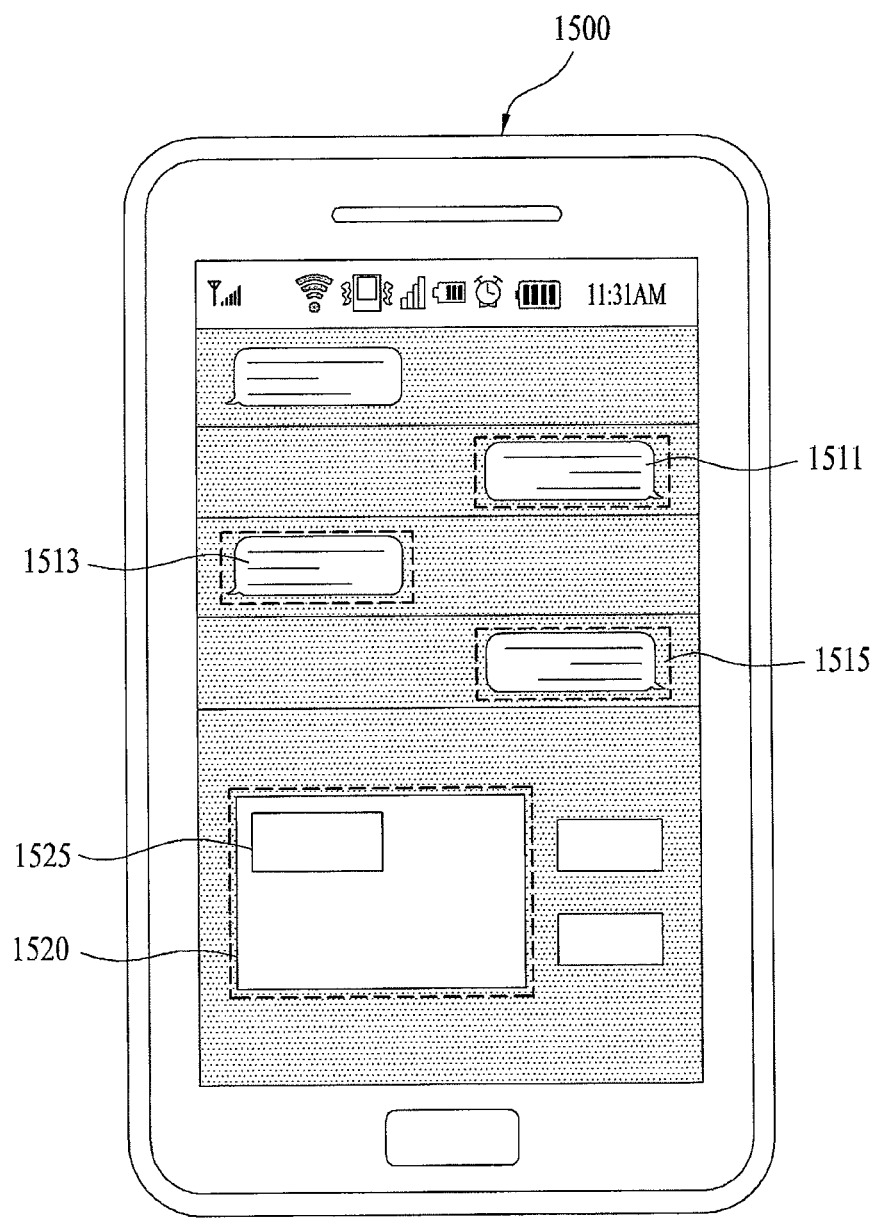
FIG. 15 to FIG. 17 are diagrams for embodiments of a screen in which an unified message is displayed.
Figure 16:
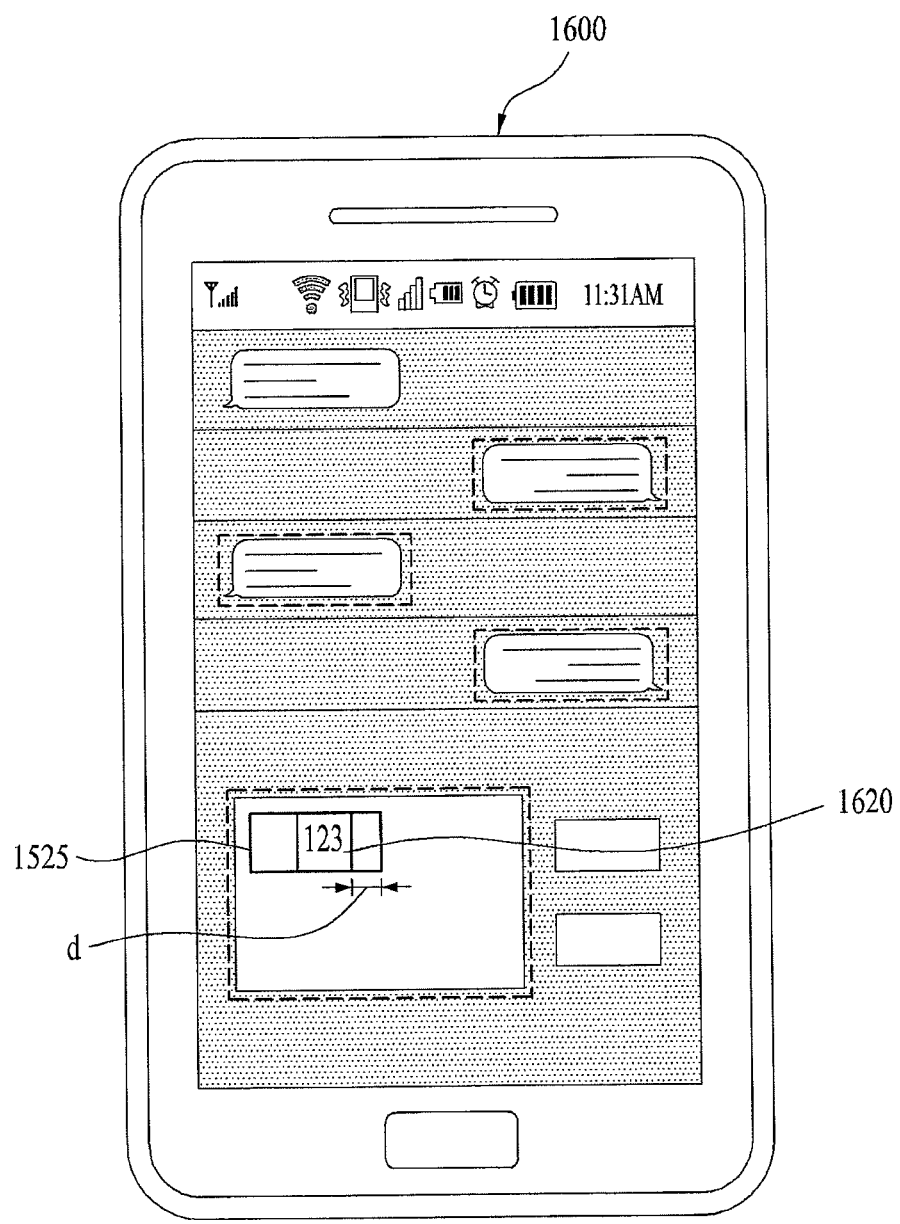
Figure 17:
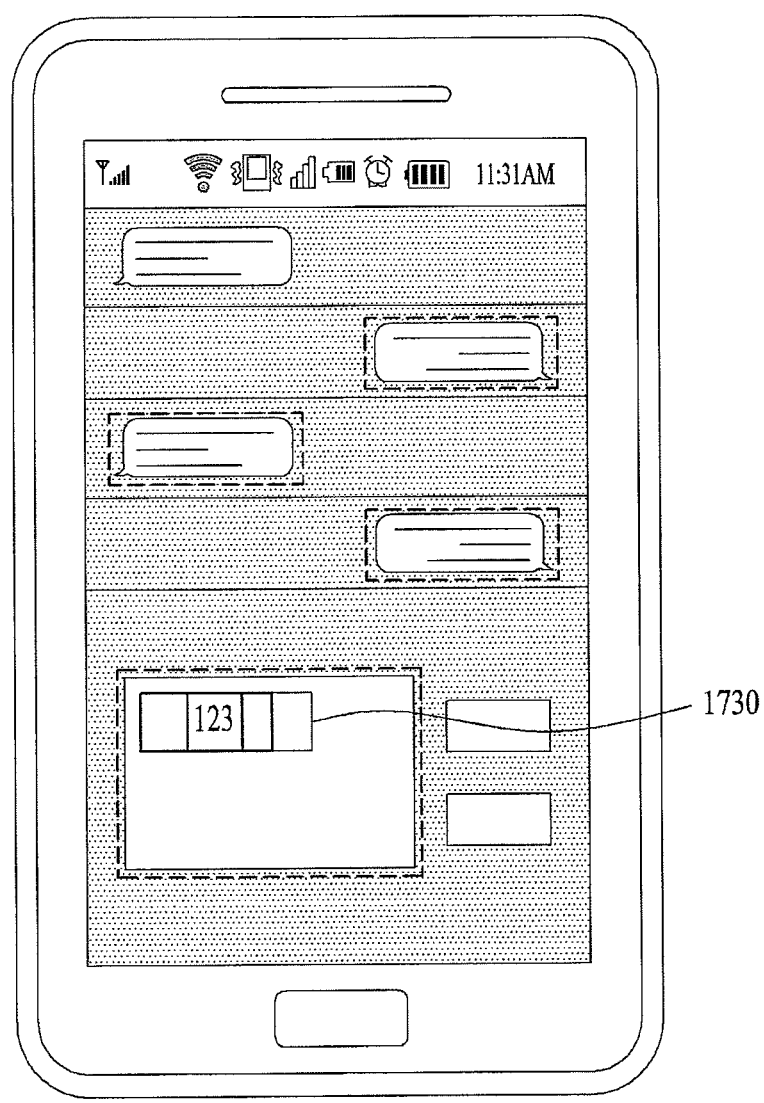

FIG. 14 is a flowchart for a performing process of another preferred embodiment for a method of controlling a display lighting according to the present invention and FIG. 15 to FIG. 17 are diagrams for embodiments of a screen in which an unified message is displayed.

Referring to FIG. 14 to FIG. 17, the control unit 180 checks a power mode of the electronic device 100 [S600]. In case of a sleep mode, the electronic device 100 may be able to perform a step S610 to a step 665 for a user action sensed in the step S605.

Yet, in some cases, the control unit 180 omits the step 600, which corresponds to a step of checking the power mode of the electronic device 100, and may be then able to perform a next step 605, which corresponds to a step of sensing the user action making a request for an unified message display.

In particular, in case of performing a prescribed $1^{st}$ function, the control unit 180 may be able to perform the step 605 of sensing the user action making a request for the unified message display after completing the step 600 of checking the power mode of the electronic device 100. In case of performing a prescribed $2^{nd}$ function, the control unit may omit the step 600 of checking the power mode of the electronic device 100 and may be then able to perform the next step 605 of sensing the user action making a request for the unified message display.

As a different case, in case of performing all functions, the control unit 180 may be able to immediately perform the step 605, which corresponds to a step of sensing the user action making a request for an unified message display, without performing the step 600, which corresponds to a step of checking the power mode of the electronic device 100.

Subsequently, the control unit 180 senses a user action making a request for a unified message display [S605].

In response to the sensing of the user action, the control unit 180 accesses a message data from the memory 160 [S610].

The control unit 180 generates a screen image to display the accessed message data [S615].

The control unit checks transmission time or transmitting time for the accessed message data [S620].

The control unit determines a lighting area among the screen image generated based on the checked transmission time or the checked transmitting time [S625].

The control unit checks whether an input area 1520 exists among the generated screen image [S630].

In case that there exists a message data input area 1520, the control unit 180 controls the screen area 1511/1513/1515 in which the lighting area to be displayed and a $15^{th}$ screen area 1525 in which an initial input area included in the message data input area 1520 to be displayed to be turned on [S635].

The control unit 180 checks a $16^{th}$ screen area 1620, which is inputted by a current data [S640].

The control unit 180 predicts a $17^{th}$ screen area 1730 to which a next data to be inputted based on the lighted $15^{th}$ input area and the checked $16^{th}$ screen area [S645]. In this case, the control unit 180 may be able to predict the $17^{th}$ screen area 1730 based on a distance (d) between a boundary line of the $15^{th}$ screen area 1525 and the $16^{th}$ screen area 1620.

And, the control unit 180 checks a data input direction and may be able to predict the $17^{th}$ screen area 1730 based on the checked input direction and the distance (d). For instance, as shown in FIG. 16, in case that a number is inputted like 1, 2, and 3, the control unit 180 may be able to check that the input direction is heading from the left to the right.

As a different case, in case that a number is inputted like 3, 2 and 1, the control unit 180 may be able to check that the input direction is heading from the right to the left.

As one embodiment, if the $16^{th}$ screen area 1620 is situated within a prescribed distance with a left or right boundary line of a full screen 1600, a part of area of one line below or above of the $16^{th}$ screen area 1620 can be predicted as the $17^{th}$ screen area 1730. As one example, the prescribed distance can be configured with one character space. For instance, if the checked input direction is heading from the left to the right and the $16^{th}$ screen area 1620 is situated within the prescribed distance with the right boundary line, a part of the area one line below of the $16^{th}$ screen area 1620 can be predicted as the $17^{th}$ screen area 1730.

The control unit 180 turns on the predicted $17^{th}$ screen area 1730 [S650]. In this case, a part of the area of the $17^{th}$ screen area 1730 may overlap the lighted screen area 1525. As a part of embodiment, the $15^{th}$ screen area 1525 can be turned off in the step S650.

In case that there does not exist the message data input area 1520, the control unit 180 controls the screen area 1511/1513/1515 in which the lighting area to be displayed to be turned on [S655].

The control unit 180 senses a user action making a request for a scroll to see a previous message [S660].

In response to the sensing of the user action, the control unit 180 controls the full screen 1500 to be turned on [S665].

Figure 18:
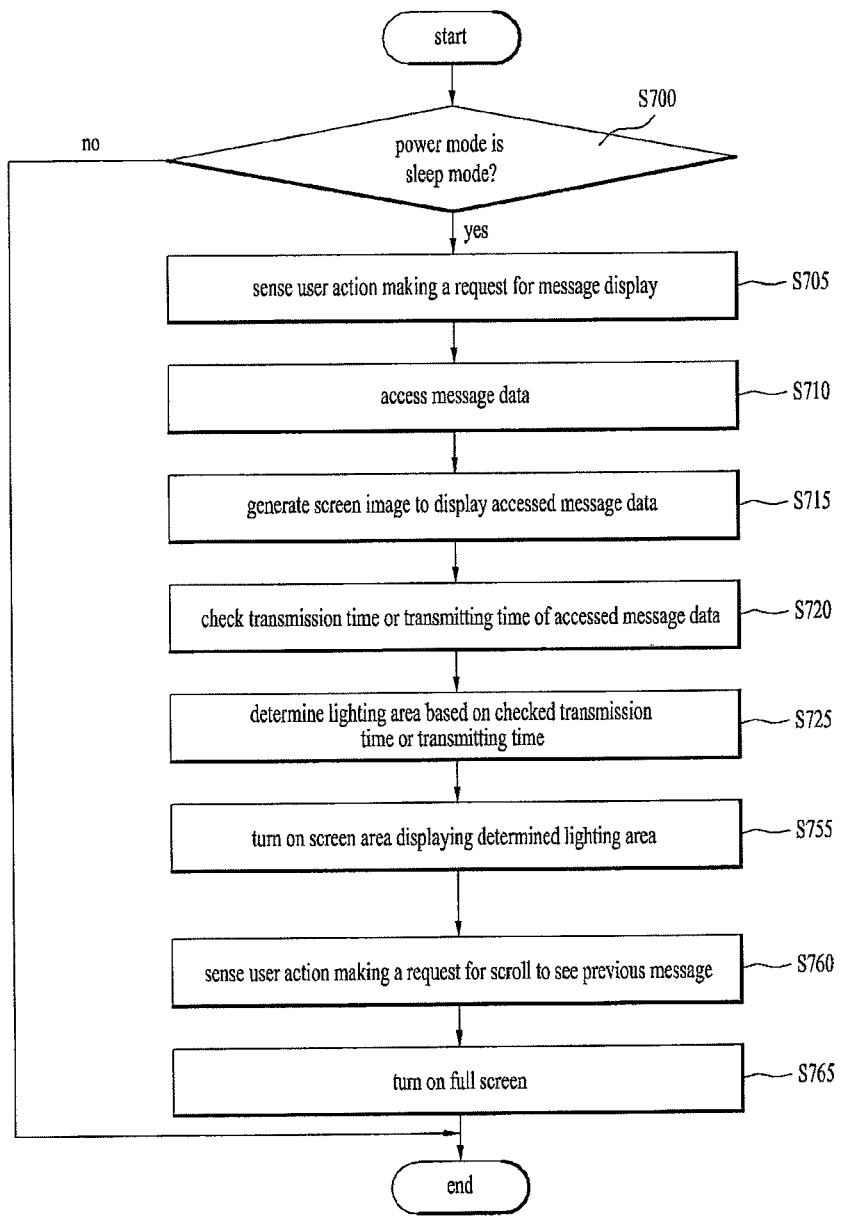
FIG. 18 is a flowchart for a performing process of another preferred embodiment for a method of controlling a display lighting according to the present invention.
Figure 19:
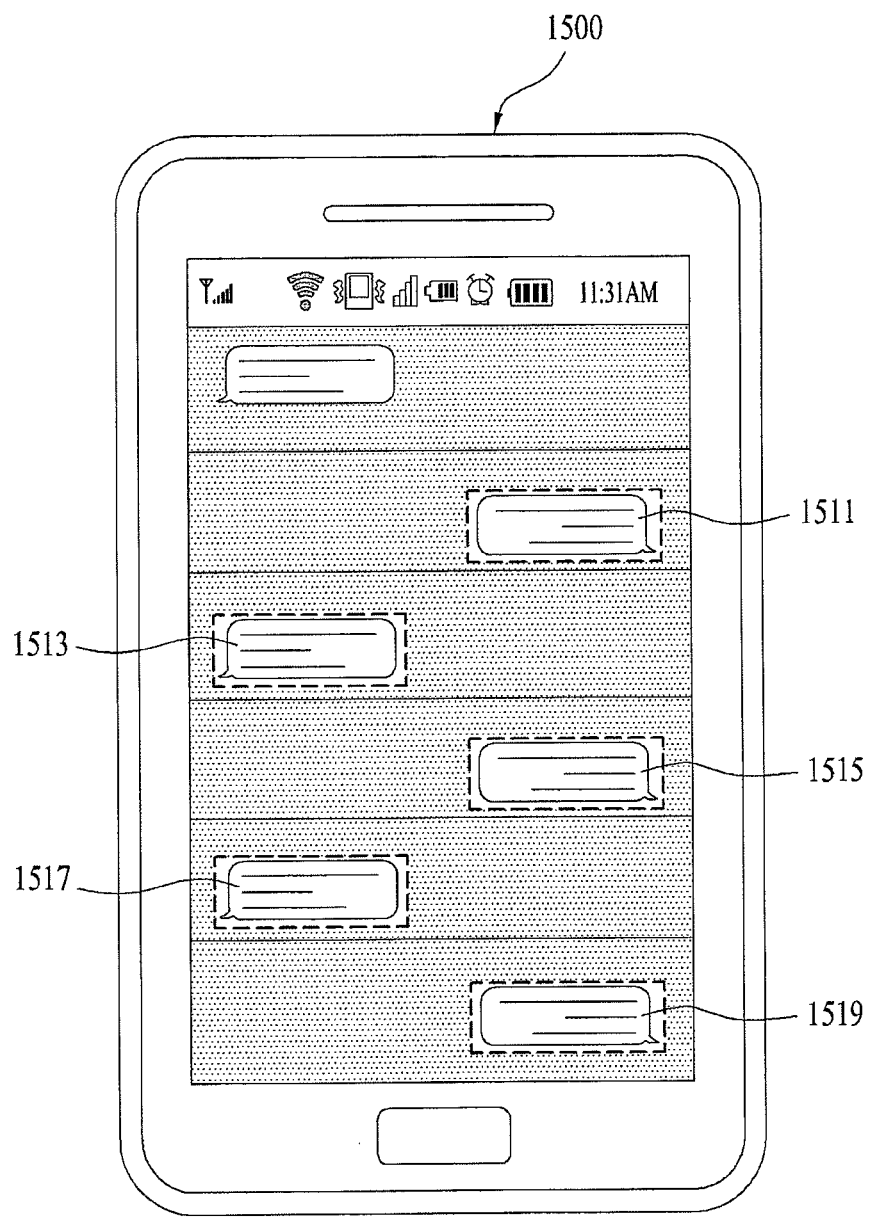
FIG. 19 are diagrams for embodiments of a screen in which a message is displayed.

FIG. 18 is a flowchart for a performing process of another preferred embodiment for a method of controlling a display lighting according to the present invention and FIG. 19 is a diagram for embodiments of a screen in which a message is displayed.

Referring to FIG. 18 and FIG. 19, the control unit 180 checks a power mode of the electronic device 100 [S700]. In case of a sleep mode, the electronic device 100 may be able to perform a step S710 to a step 765 for a user action sensed in the step S705.

Yet, in some cases, the control unit 180 omits the step 700, which corresponds to a step of checking the power mode of the electronic device 100, and may be then able to perform a next step 705, which corresponds to a step of sensing the user action making a request for a message display.

In particular, in case of performing a prescribed $1^{st}$ function, the control unit 180 may be able to perform the step 705 of sensing the user action making a request for the message display after completing the step 700 of checking the power mode of the electronic device 100. In case of performing a prescribed $2^{nd}$ function, the control unit may omit the step 700 of checking the power mode of the electronic device 100 and may be then able to perform the next step 705 of sensing the user action making a request for the message display.

As a different case, in case of performing all functions, the control unit 180 may be able to immediately perform the step 705, which corresponds to a step of sensing the user action making a request for a message display, without performing the step 700, which corresponds to a step of checking the power mode of the electronic device 100.

Subsequently, the control unit 180 senses a user action making a request for a message display [S705].

In response to the sensing of the user action, the control unit 180 accesses a message data from the memory 160 [S710].

The control unit 180 generates a screen image to display the accessed message data [S715].

The control unit 180 checks transmission time or transmitting time for the accessed message data [S720].

The control unit 180 determines a lighting area among the screen image generated based on the checked transmission time or the checked transmitting time [S725].

The control unit 180 controls a screen area 1511/1513/1515/1517/1519 in which the lighting area to be displayed to be turned on [S755].

The control unit 180 senses a user action making a request for a scroll to see a previous message [S760].

In response to the sensing of the user action, the control unit 180 controls a full screen 1500 to be turned on [S765].

Figure 20:
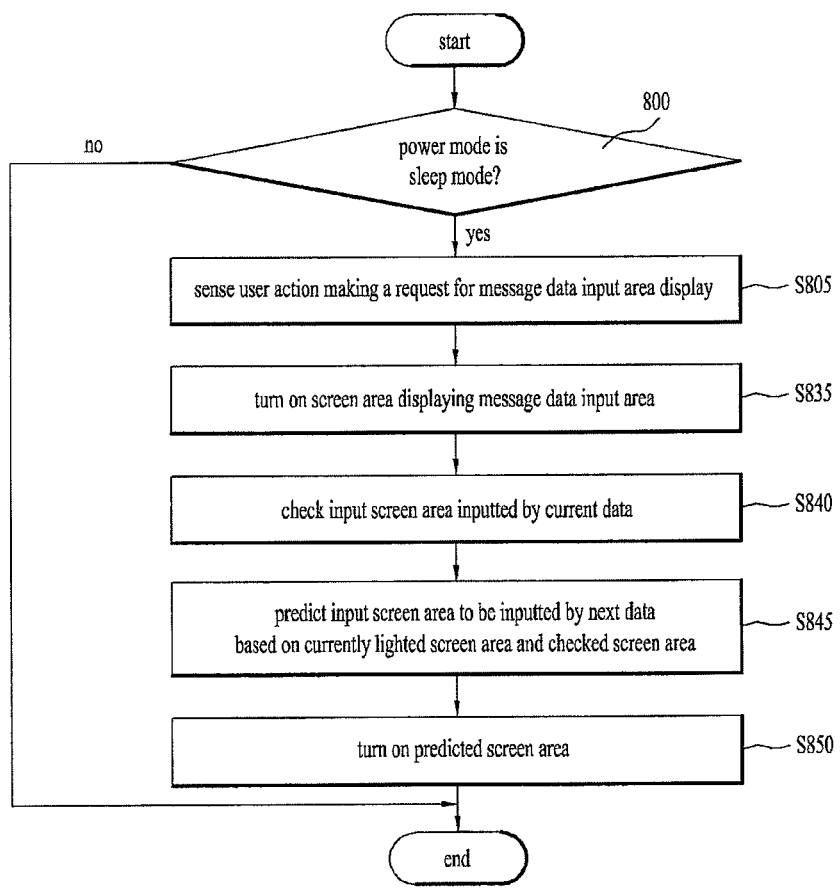
FIG. 20 is a flowchart for a performing process of another preferred embodiment for a method of controlling a display lighting according to the present invention.
Figure 21:
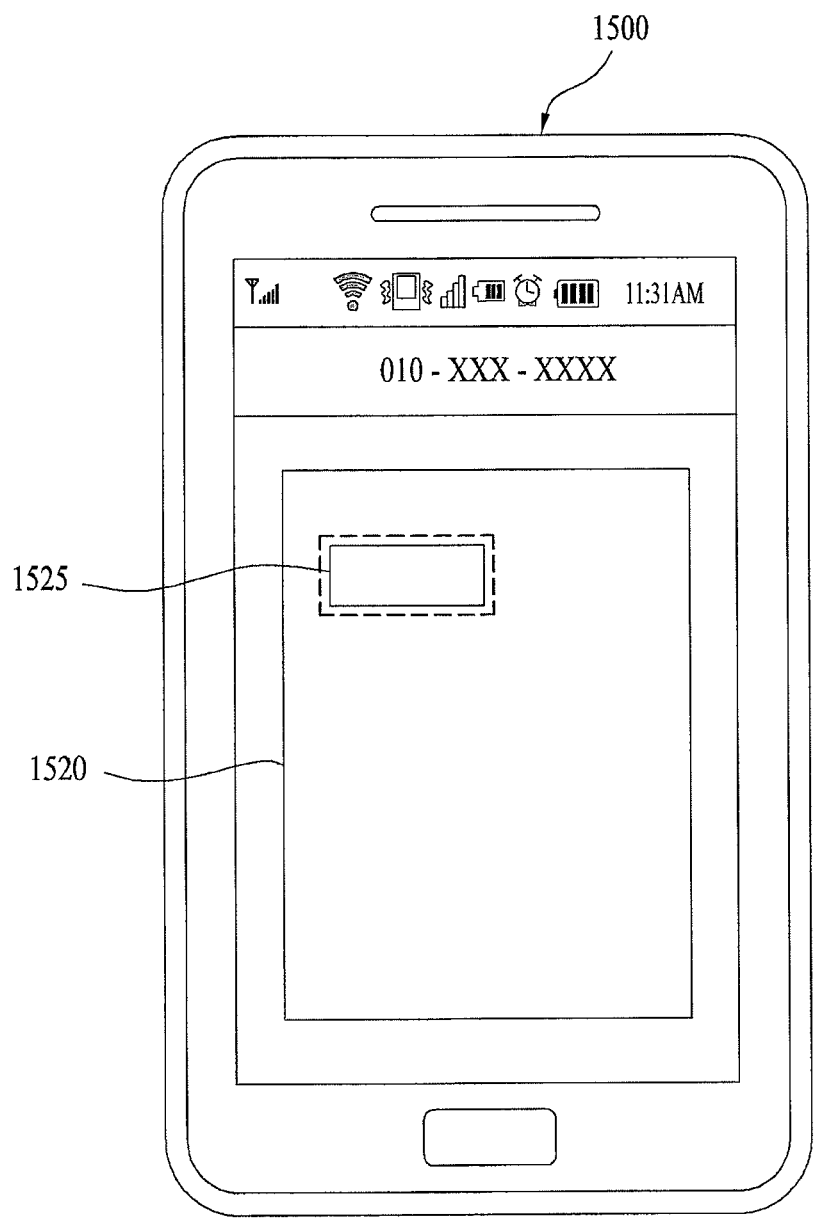
FIG. 21 to FIG. 23 are diagrams for embodiments of a screen in which a message data input area is displayed.
Figure 22:
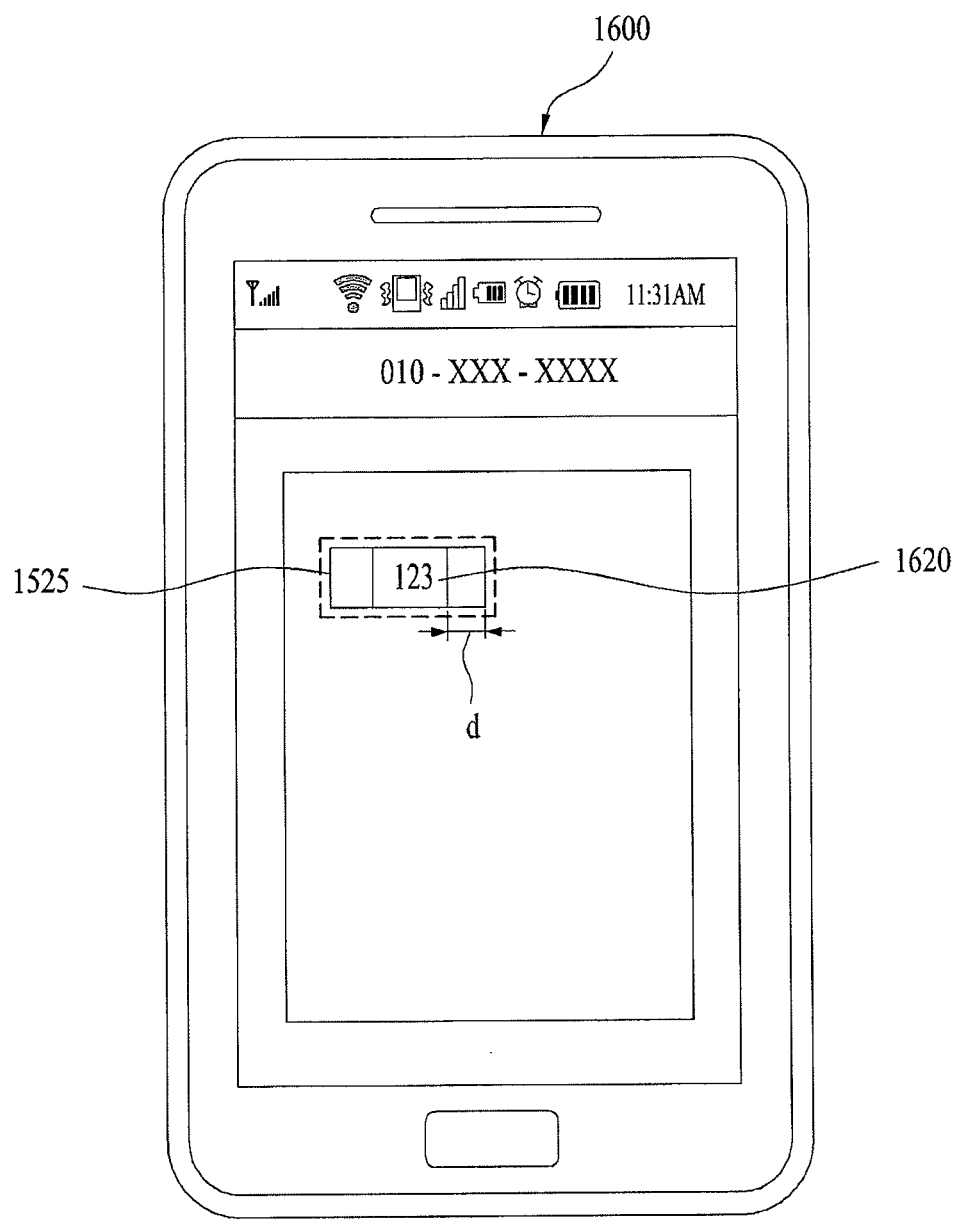
Figure 23:
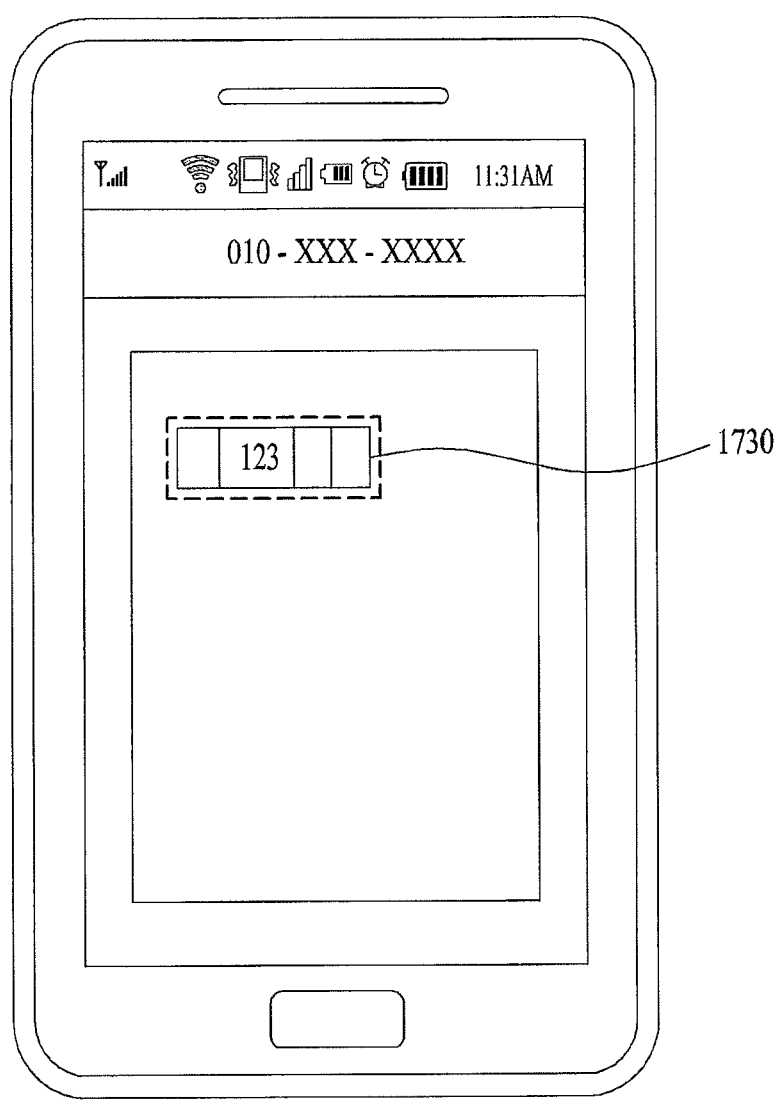

FIG. 20 is a flowchart for a performing process of another preferred embodiment for a method of controlling a display lighting according to the present invention and FIG. 21 to FIG. 23 are diagrams for embodiments of a screen in which a message data input area is displayed.

Referring to FIG. 20 to FIG. 23, the control unit 180 checks a power mode of the electronic device 100 [S800]. In case of a sleep mode, the electronic device 100 may be able to perform a step S835 to a step 850 for a user action sensed in the step S805.

Yet, in some cases, the control unit 180 omits the step 800, which corresponds to a step of checking the power mode of the electronic device 100, and may be then able to perform a next step 805, which corresponds to a step of sensing the user action making a request for a message data input area display.

In particular, in case of performing a prescribed 1$^{st}$ function, the control unit 180 may be able to perform the step 805 of sensing the user action making a request for the message data input area display after completing the step 800 of checking the power mode of the electronic device 100. In case of performing a prescribed 2$^{nd}$ function, the control unit may omit the step 800 of checking the power mode of the electronic device 100 and may be then able to perform the next step 805 of sensing the user action making a request for the message data input area display.

As a different case, in case of performing all functions, the control unit 180 may be able to immediately perform the step 805, which corresponds to a step of sensing the user action making a request for a message data input area display, without performing the step 800, which corresponds to a step of checking the power mode of the electronic device 100.

Subsequently, the control unit 180 senses a user action making a request for a message data input area display [S805].

In response to the sensing of the user action, the control unit 180 controls a 15$^{th}$ screen area 1525 in which an initial input area included in the message data input area 1520 to be displayed to be turned on [S835].

The control unit 180 checks a 16$^{th}$ screen area 1620, which is inputted by a current data [S840].

The control unit 180 predicts a 17$^{th}$ screen area 1730 to which a next data to be inputted based on the lighted 15$^{th}$ input area and the checked 16$^{th}$ screen area [S845]. In this case, the control unit 180 may be able to predict the 17$^{th}$ screen area 1730 based on a distance (d) between a boundary line of the 15$^{th}$ screen area 1525 and the 16$^{th}$ screen area 1620.

And, the control unit 180 checks a data input direction and may be able to predict the 17$^{th}$ screen area 1730 based on the checked input direction and the distance (d). For instance, as shown in FIG. 22, in case that a number is inputted like 1, 2, and 3, the control unit 180 may be able to check that the input direction is heading from the left to the right.

As a different case, in case that a number is inputted like 3, 2 and 1, the control unit 180 may be able to check that the input direction is heading from the right to the left.

As one embodiment, if the 16$^{th}$ screen area 1620 is situated within a prescribed distance with a left or right boundary line of a full screen 1600, a part of area of one line below or above of the 16$^{th}$ screen area 1620 can be predicted as the 17$^{th}$ screen area 1730. As one example, the prescribed distance can be configured with one character space. For instance, if the checked input direction is heading from the left to the right and the 16$^{th}$ screen area 1620 is situated within the prescribed distance with the right boundary line, a part of the area one line below of the 16$^{th}$ screen area 1620 can be predicted as the 17$^{th}$ screen area 1730.

The control unit 180 turns on the predicted 17$^{th}$ input screen area 1730 [S850]. In this case, a part of the area of the predicted 17$^{th}$ screen area 1730 may overlap the lighted 15$^{th}$ screen area 1525. As a part of embodiment, the 15$^{th}$ screen area 1525 can be turned off in the step S850.

As mentioned in the foregoing description, according to the electronic device and a method of controlling a display lighting according to the present invention, since a screen area to be lighted is predicted based on a user action, a lighted screen area, and a displayed content, the display lighting can be suitably controlled according to a use state of a user. Moreover, since a screen area currently used or an available screen area is turned on and the rest of the screen area is turned off, it may enable a user to use the electronic device without any trouble while using the electronic device with minimum power consumption.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a display lighting of an electronic device, the method comprising:
   lighting a first screen area of a display of the electronic device;
   sensing a user action from a second screen area positioned within the first screen area by a sensor of the electronic device;
   calculating a distance between a boundary line of the first screen area and a boundary line of the second screen area;
   predicting a location of a third screen area to be used on the display of the electronic device based on the calculated distance; and
   starting to light a light emitting device of the display in an area corresponding to the predicted third screen area.

2. The method of claim 1, wherein the third screen area to be used is predicted based on the sensed user action and a previously sensed user action.

3. The method of claim 1, wherein a direction of the user action is determined based on the sensed user action and a previously sensed user action, and
   wherein the third screen area to be used is predicted based on the determined direction.

4. The method of claim 1, wherein the third screen area to be used is predicted further based on a displayed content.

5. The method of claim 1, wherein if the user action corresponds to an approach of a touch object towards the electronic device, the third screen area to be used is predicted based on a distance between the touch object and the electronic device.

6. The method of claim 5, wherein the touch object comprises at least one selected from the group consisting of a finger, a hand, a palm, and a stylus.

7. The method of claim 1, wherein if the user action corresponds to a touch on a screen of the display, a screen area including the sensed touch area is predicted as the third screen area to be used.

8. The method of claim 1, wherein the user action comprises a touch on an area of a screen of the display, and
   wherein the third screen area predicting further comprises:
   determining whether the sensed touch area is situated within a prescribed distance with respect to a left boundary line or a right boundary line of the screen of the display;

if the sensed touch area is situated within the prescribed distance, locating a screen line including the sensed touch area and an area including a prescribed screen line situated below of the screen line as the third screen area to be used; and if the sensed touch area is not situated within the prescribed distance, locating the screen line including the sensed touch area as the third screen area to be used.

9. A method of controlling a display lighting of an electronic device, the method comprising:

sensing a user action requesting an integrated message display;

accessing a message data from a storing device in response to the user action;

determining a transmission time or a transmitting time of the accessed message data;

determining a first screen area to be lighted among a screen area based on the determined transmission time or the determined transmitting time;

checking whether the first screen area to be input a message exists among the screen area;

sensing the user action from a second screen area positioned within the first screen area by a sensor of the electronic device;

calculating a distance between a boundary line of the first screen area and a boundary line of the second screen area;

predicting a location of a third screen area to be used on a display of the electronic device based on the calculated distance; and starting to light a light emitting device of the display in an area corresponding to the predicted third screen area.

10. The method of claim 9, further comprising:

sensing a user action requesting a scroll to see a previous message; and lighting an entire light emitting device in response to the user action requesting the scroll.

11. An electronic device, comprising:

a display including a plurality of light emitting devices; and a control unit configured to control to light a first screen area of the display of the electronic device, sense a user action from a second screen area positioned within the first screen area by a sensor of the electronic device, calculate a distance between a boundary line of the first screen area and a boundary line of the second screen area, predict a location of a third screen area to be used on the display of the electronic device based on the calculated distance, and start lighting a light emitting device of the display in an area corresponding to the predicted third screen area.

12. The electronic device of claim 11, wherein the plurality of light emitting devices comprise at least an organic light-emitting diode (OLED).

13. The electronic device of claim 12, wherein the control unit is configured to predict the third screen area to be lighted according to a direction of the user action, and wherein the direction of the user action comprises a display touch direction of a user or a data input direction of the user.

14. The electronic device of claim 11, wherein if a direction of a currently sensed user action and a direction of a previously sensed user action are identical with each other, the control unit is configured to determine a position of the third screen area to be turned on based on the identical direction.

15. The electronic device of claim 11, wherein if a direction of the user action is contiguously identical for more than one time, the control unit is configured to determine the third screen area to be turned on in a corresponding direction.

16. An electronic device, comprising:

a display including a plurality of light emitting devices;

a memory unit configured to store a message data; and a control unit configured to control to sense a user action requesting an integrated message display, access the message data from a storing device in response to the user action, determine a transmission time or a transmitting time of the accessed message data, determine a first screen area to be lighted among a screen area based on the determined transmission time or the determined transmitting time, check whether the first screen area to be input a message exists among the screen area, sense the user action from a second screen area positioned within the first screen area by a sensor of the electronic device, calculate a distance between a boundary line of the first screen area and a boundary line of the second screen area, predict a location of a third screen area to be used on the display of the electronic device based on the calculated distance, and start lighting a light emitting device of the display in an area corresponding to the predicted third screen area.

17. The electronic device of claim 16, wherein the plurality of light emitting devices comprise at least an organic light-emitting diode (OLED).

* * * * *